United States Patent
Nonaka et al.

(10) Patent No.: US 9,355,673 B2
(45) Date of Patent: May 31, 2016

(54) RECORDING MEDIUM DELIVERY MECHANISM AND RECORDING MEDIUM CHANGER

(71) Applicant: Sony Corporation, Tokyo (JP)

(72) Inventors: Wataru Nonaka, Tokyo (JP); Osamu Shimizu, Kanagawa (JP); Keiji Jitsukawa, Chiba (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 14/229,123

(22) Filed: Mar. 28, 2014

(65) Prior Publication Data

US 2014/0301809 A1    Oct. 9, 2014

(30) Foreign Application Priority Data

Apr. 5, 2013    (JP) ................................. 2013-079870

(51) Int. Cl.
  *G11B 17/22*    (2006.01)
  *G11B 17/34*    (2006.01)
  *G11B 15/68*    (2006.01)

(52) U.S. Cl.
  CPC .......... *G11B 17/225* (2013.01); *G11B 15/6835* (2013.01); *G11B 17/34* (2013.01)

(58) Field of Classification Search
  CPC ............................. G11B 17/225; G11B 17/34
  USPC ....................................................... 220/300
  See application file for complete search history.

(56) References Cited

U.S. PATENT DOCUMENTS

| 4,772,968 | A | * | 9/1988 | Nonaka | ............... | G11B 15/6835 360/92.1 |
| 4,827,463 | A | * | 5/1989 | Motoyoshi | ............. | G11B 19/10 369/30.43 |
| 4,853,916 | A | * | 8/1989 | Tomita | ................. | G11B 17/225 360/98.06 |
| 4,903,252 | A | * | 2/1990 | Tanaka | ................. | G11B 17/225 360/98.06 |
| 5,036,503 | A | * | 7/1991 | Tomita | ................... | G11B 19/12 360/92.1 |
| 5,146,375 | A | * | 9/1992 | Satoh | ................... | G11B 15/675 360/92.1 |
| 5,726,828 | A | * | 3/1998 | Kakuta | ............... | G11B 17/028 360/98.01 |
| 5,781,517 | A | * | 7/1998 | Nakajima | ........... | G11B 17/225 369/30.43 |

(Continued)

FOREIGN PATENT DOCUMENTS

JP    2009-259301 A    11/2009

*Primary Examiner* — Gerald McClain
(74) *Attorney, Agent, or Firm* — Sheridan Ross P.C.

(57) ABSTRACT

The recording medium delivery mechanism includes a slider, a holding lever, a biasing portion, a lever-opening operation portion, and a housing and discharging drive unit. The slider is supported on a chassis to be movable in housing and discharging directions of a recording medium. The holding lever is rotatably supported by the slider and configured to hold the recording medium. The biasing portion is configured to bias the holding lever toward the recording medium. The lever-opening operation portion is provided to the holding lever, is engaged with a lever engagement portion provided to the chassis by a movement of the slider in the discharging direction of the recording medium, and configured to rotate the holding lever in a direction away from the recording medium. The housing and discharging drive unit is configured to move the chassis and the slider in the housing and discharging directions of the recording medium.

12 Claims, 29 Drawing Sheets

(56) References Cited

U.S. PATENT DOCUMENTS

| | | | | |
|---|---|---|---|---|
| 5,805,561 A * | 9/1998 | Pollard | ................ | G11B 17/225 360/92.1 |
| 5,894,469 A * | 4/1999 | Usami | ................ | G11B 17/225 369/195 |
| 5,940,361 A * | 8/1999 | Proctor | ................ | G11B 17/22 369/79 |
| 6,301,204 B1 * | 10/2001 | Yamada | ................ | G11B 17/225 369/34.01 |
| 6,512,653 B1 * | 1/2003 | Sasaki | ................ | G11B 15/6835 360/92.1 |
| 7,016,144 B2 * | 3/2006 | Yamakawa | ................ | G11B 17/225 360/92.1 |
| 7,212,375 B2 * | 5/2007 | Dickey | ................ | G11B 15/68 360/96.4 |
| 7,753,638 B2 * | 7/2010 | Ishiyama | ................ | G11B 15/6835 414/277 |
| 8,899,406 B2 * | 12/2014 | Nespeca | ................ | G11B 15/68 198/468.6 |

* cited by examiner

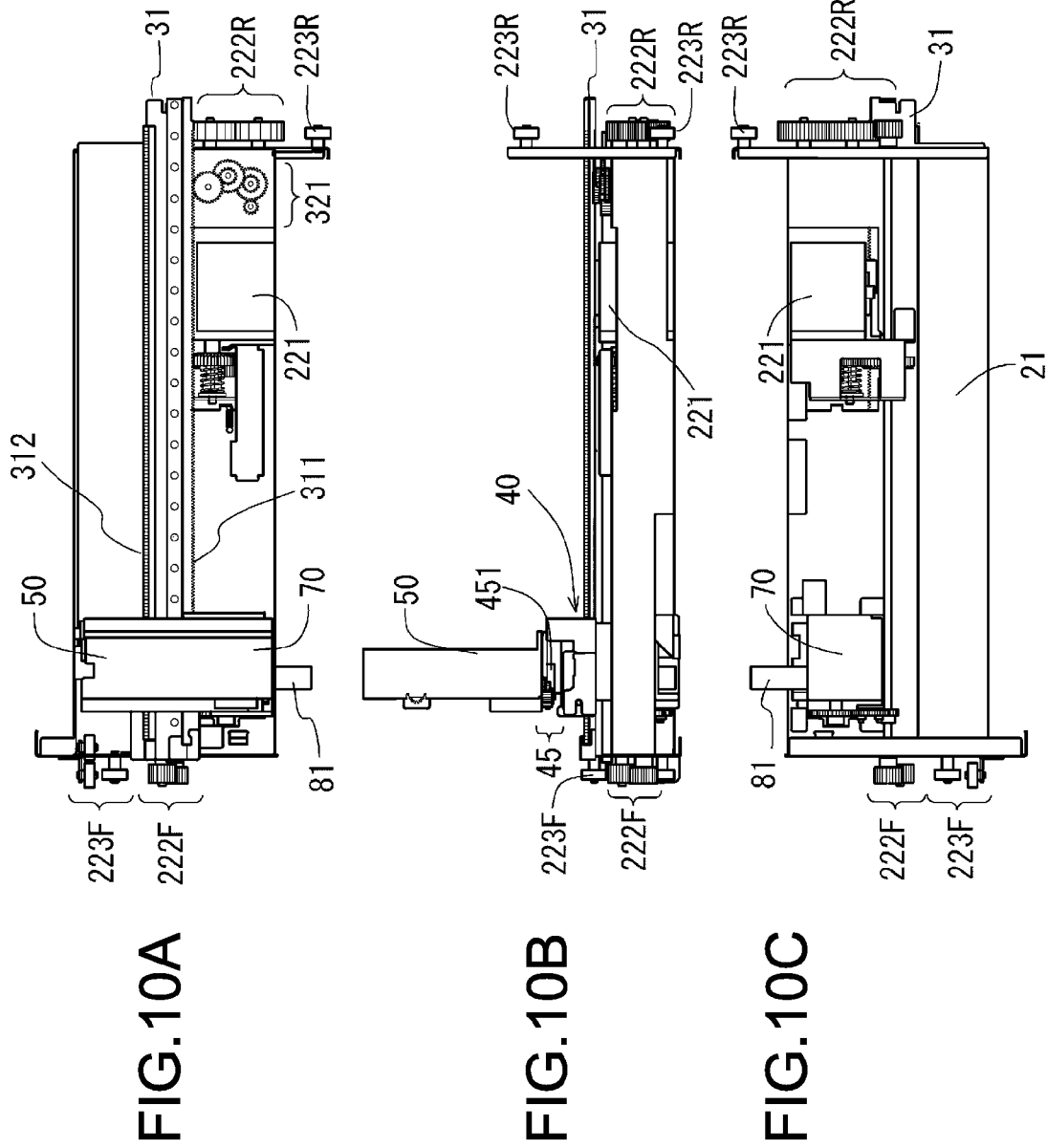

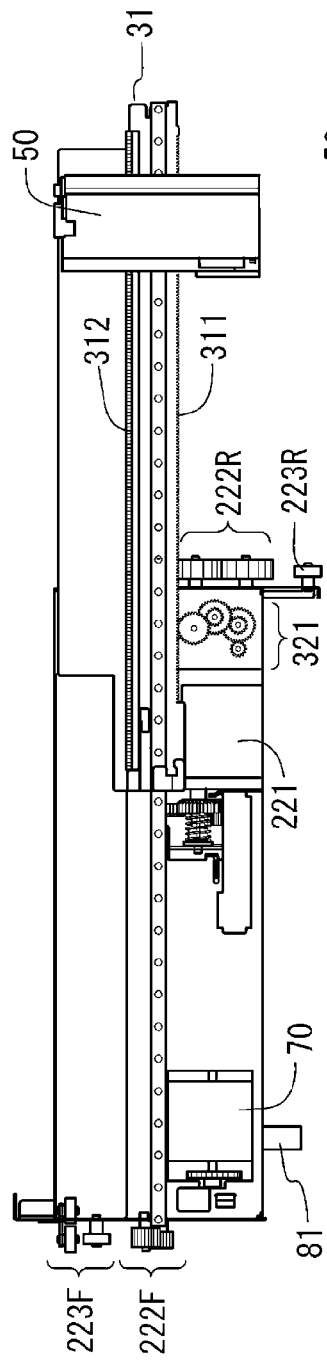
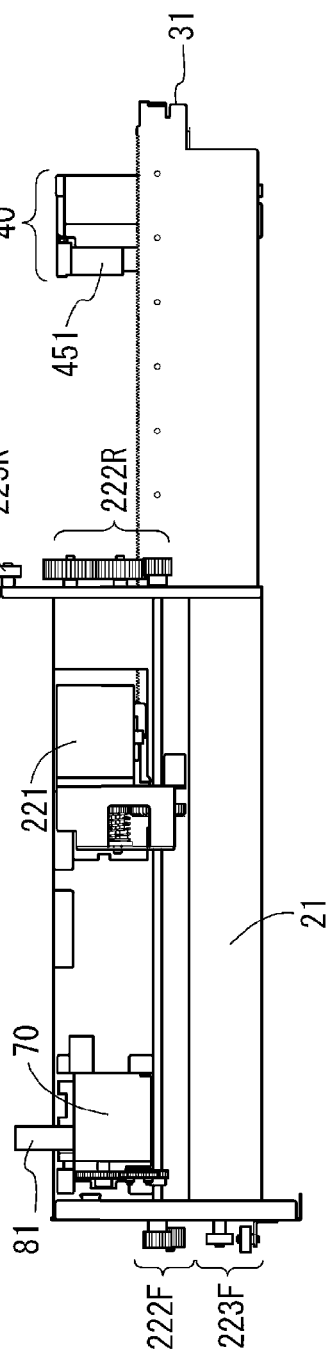
FIG.11A
FIG.11B
FIG.11C

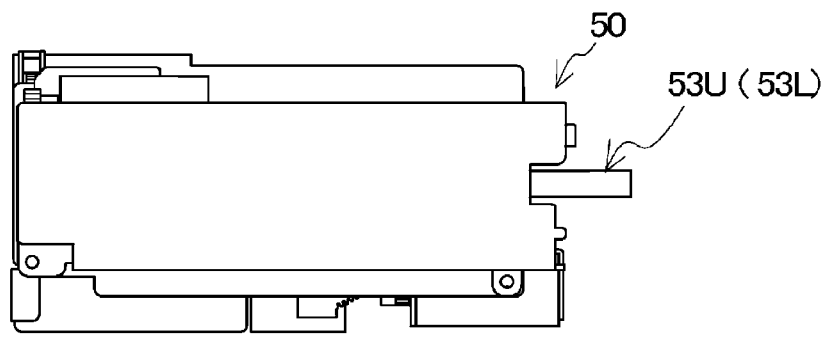
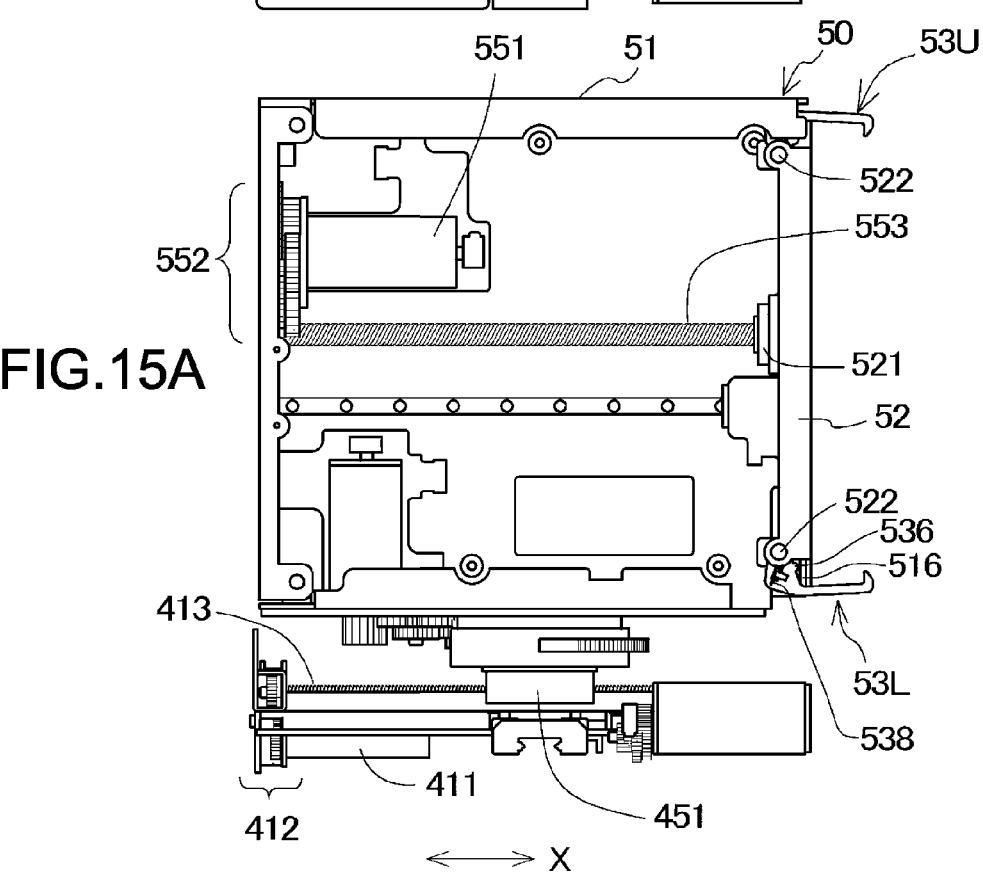

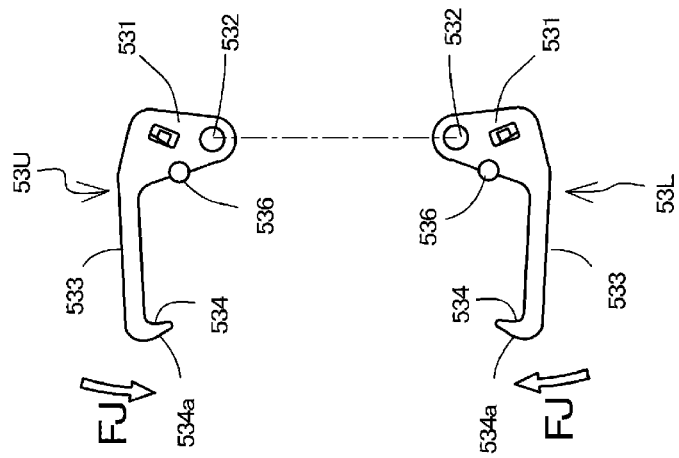
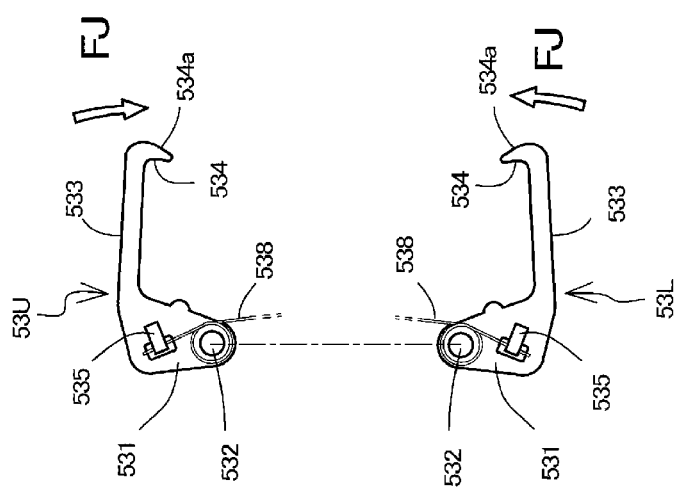

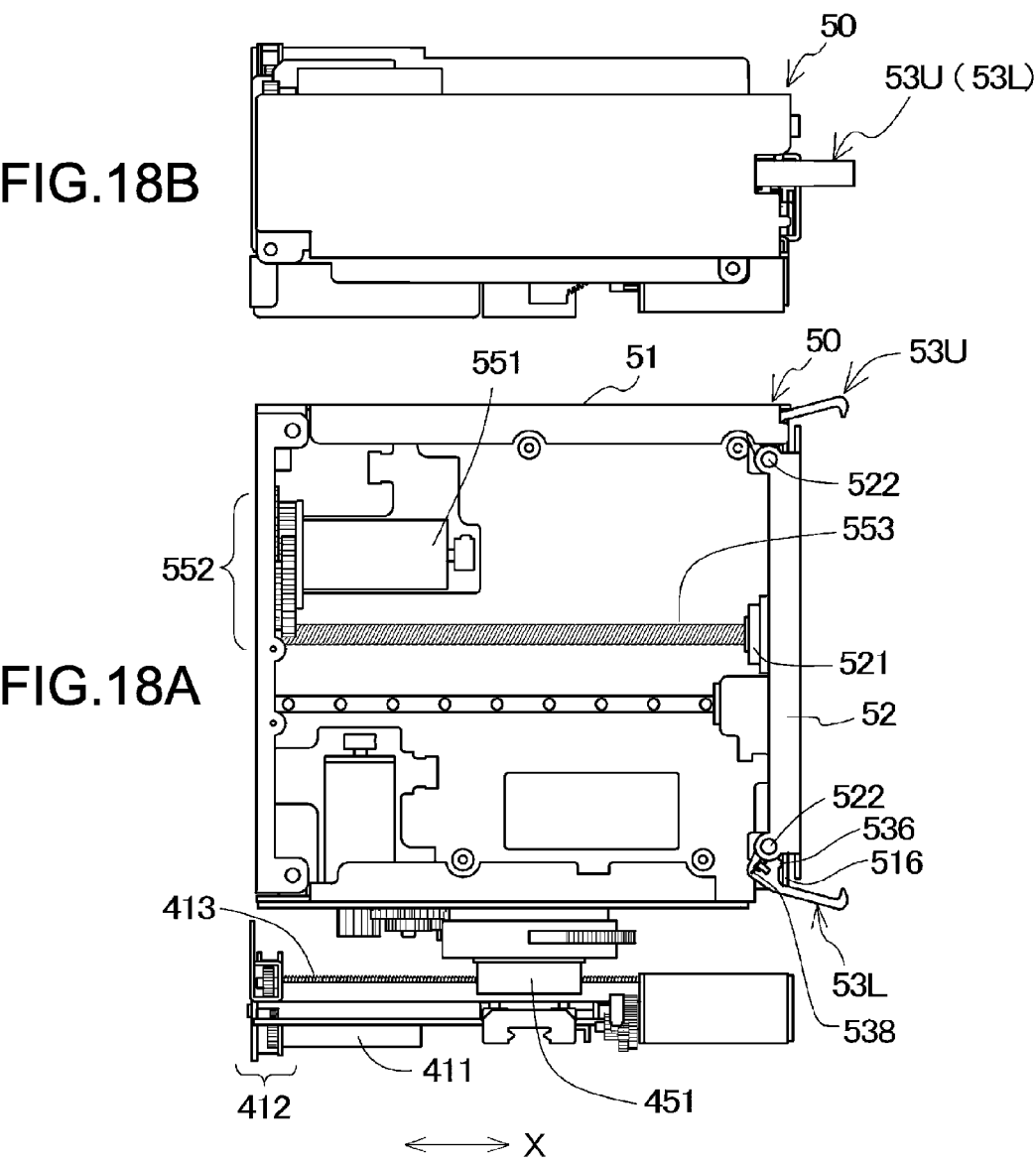

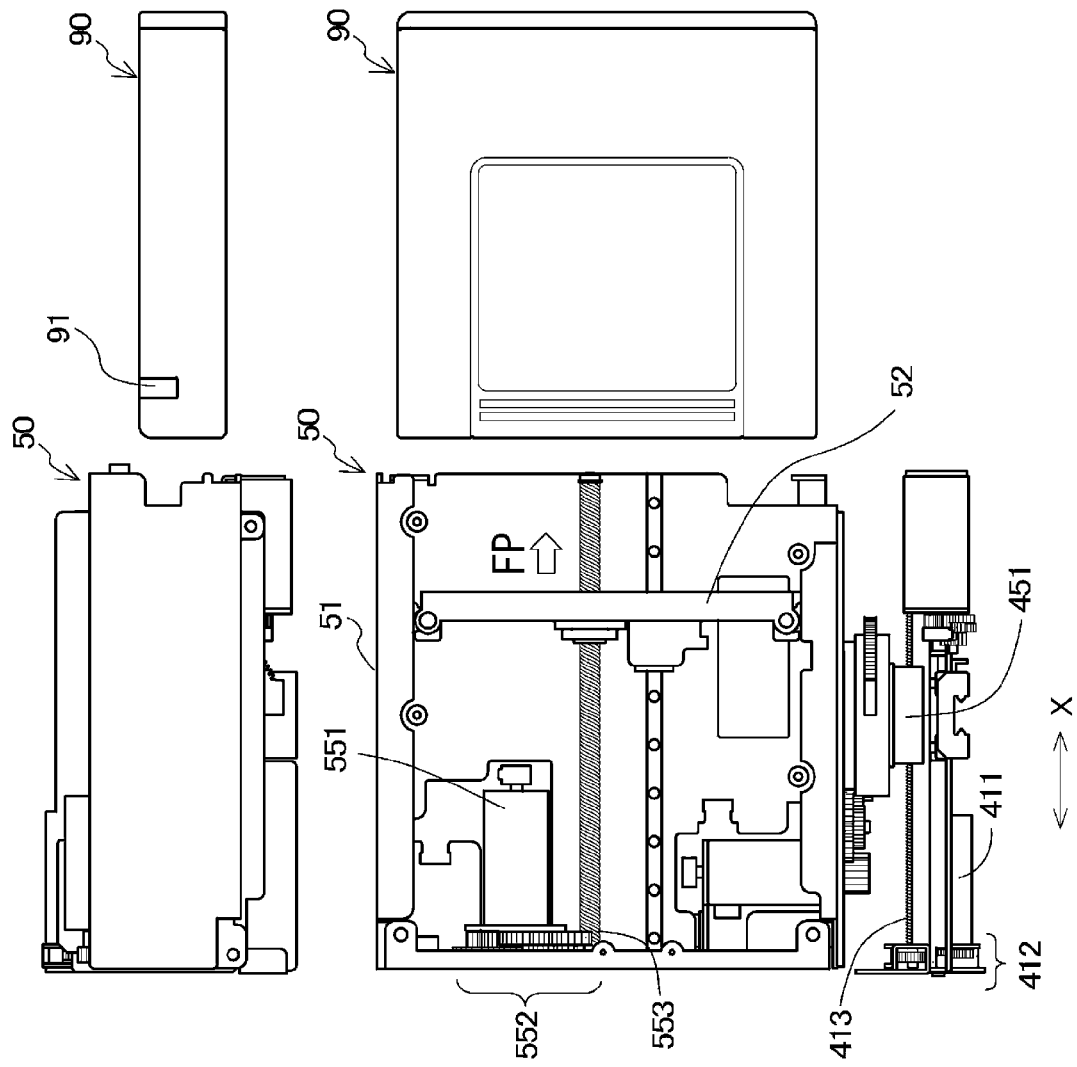

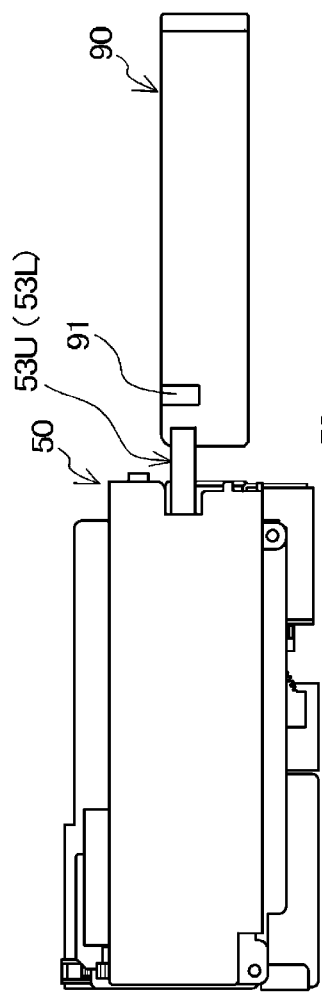
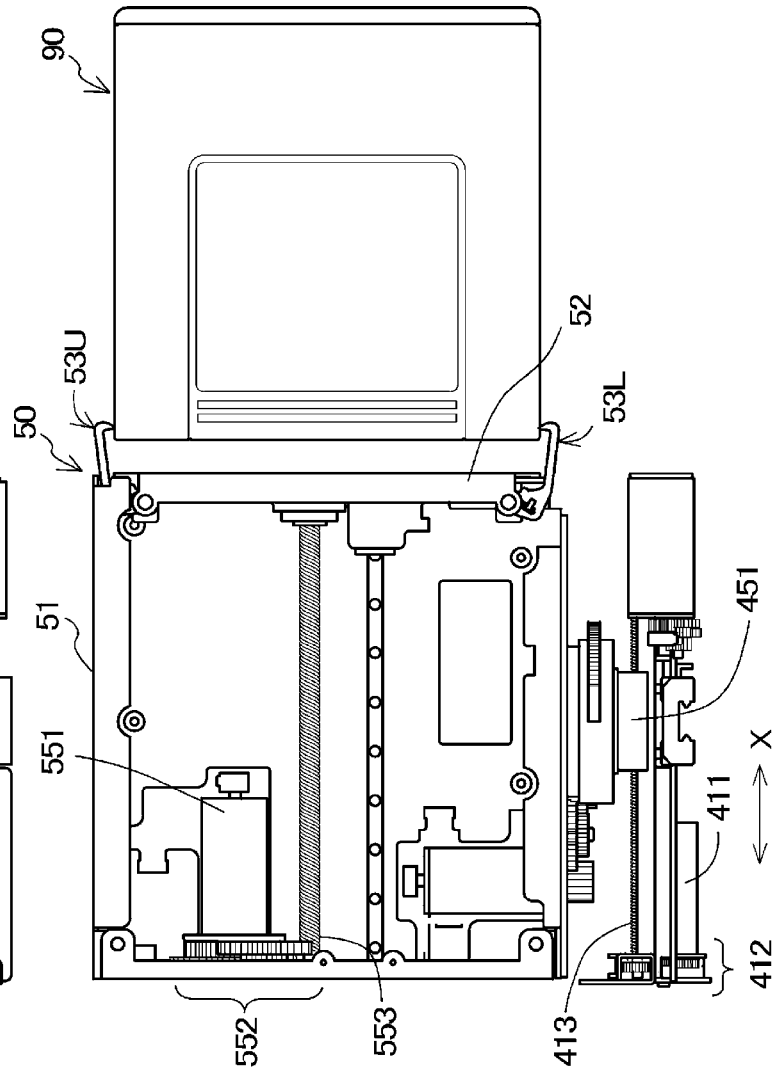
FIG.20B
FIG.20A

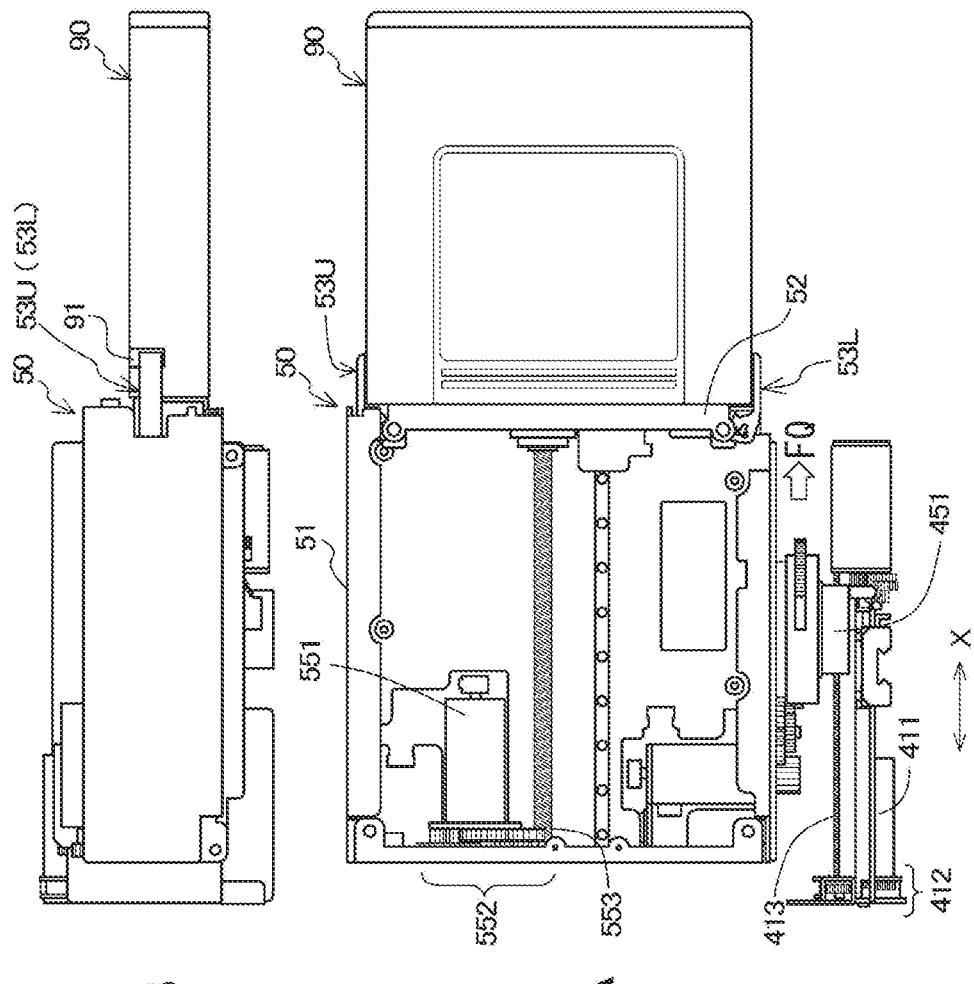

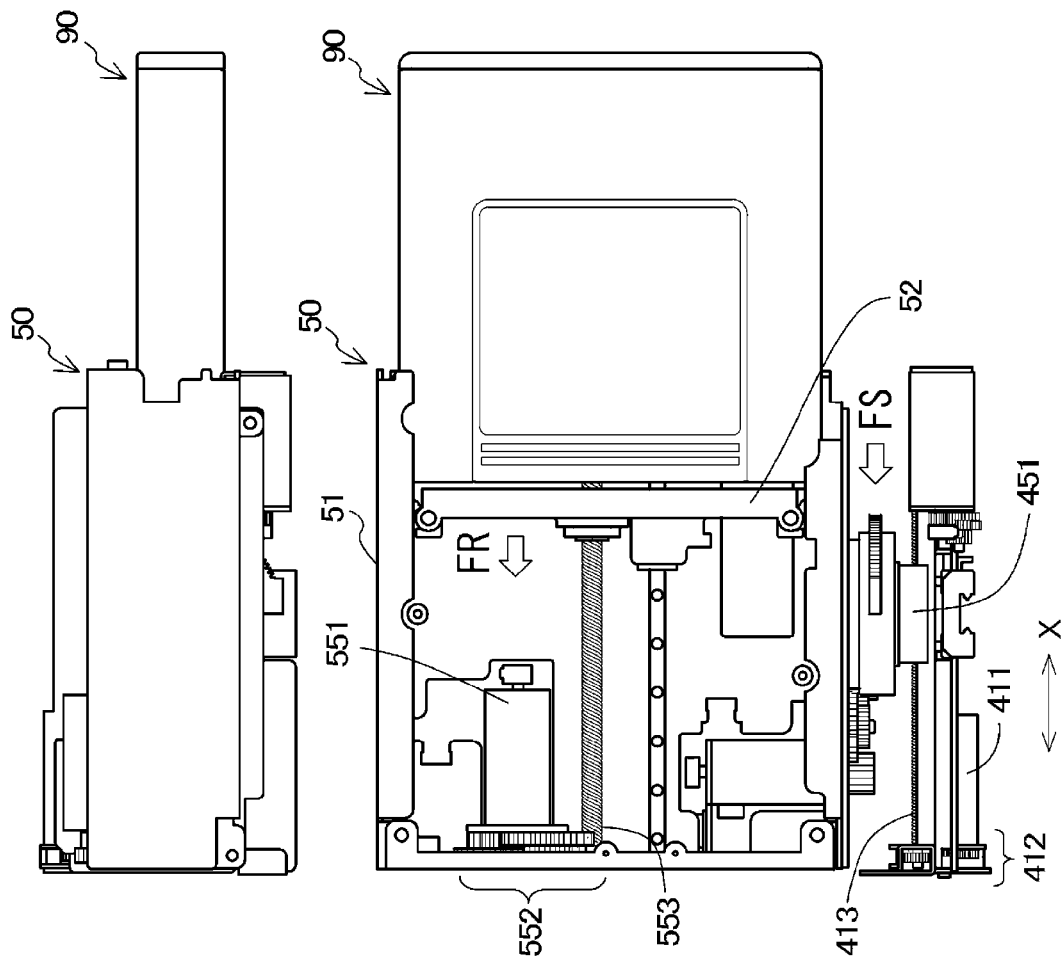

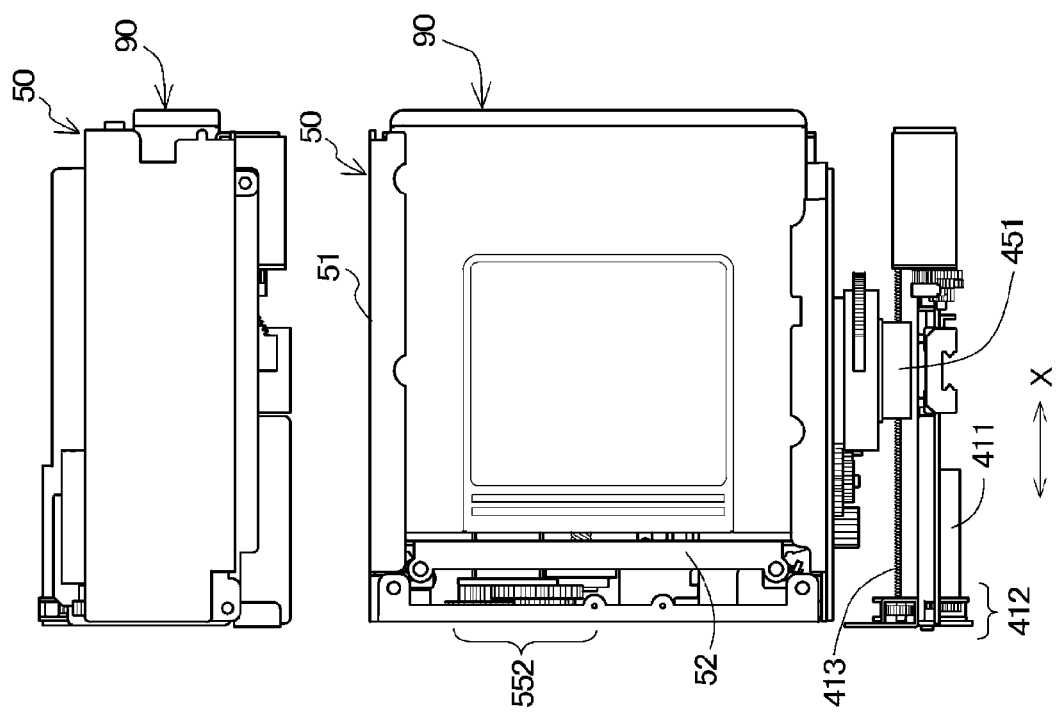

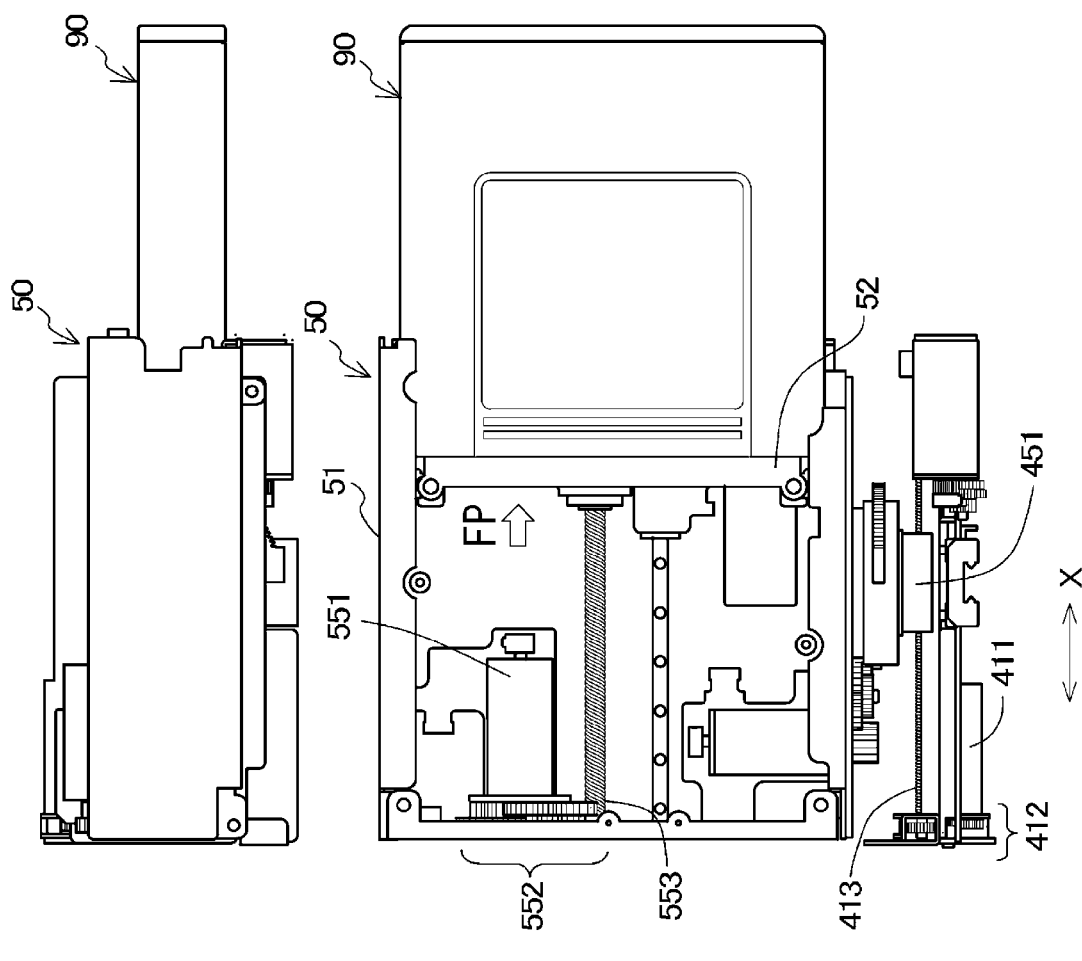

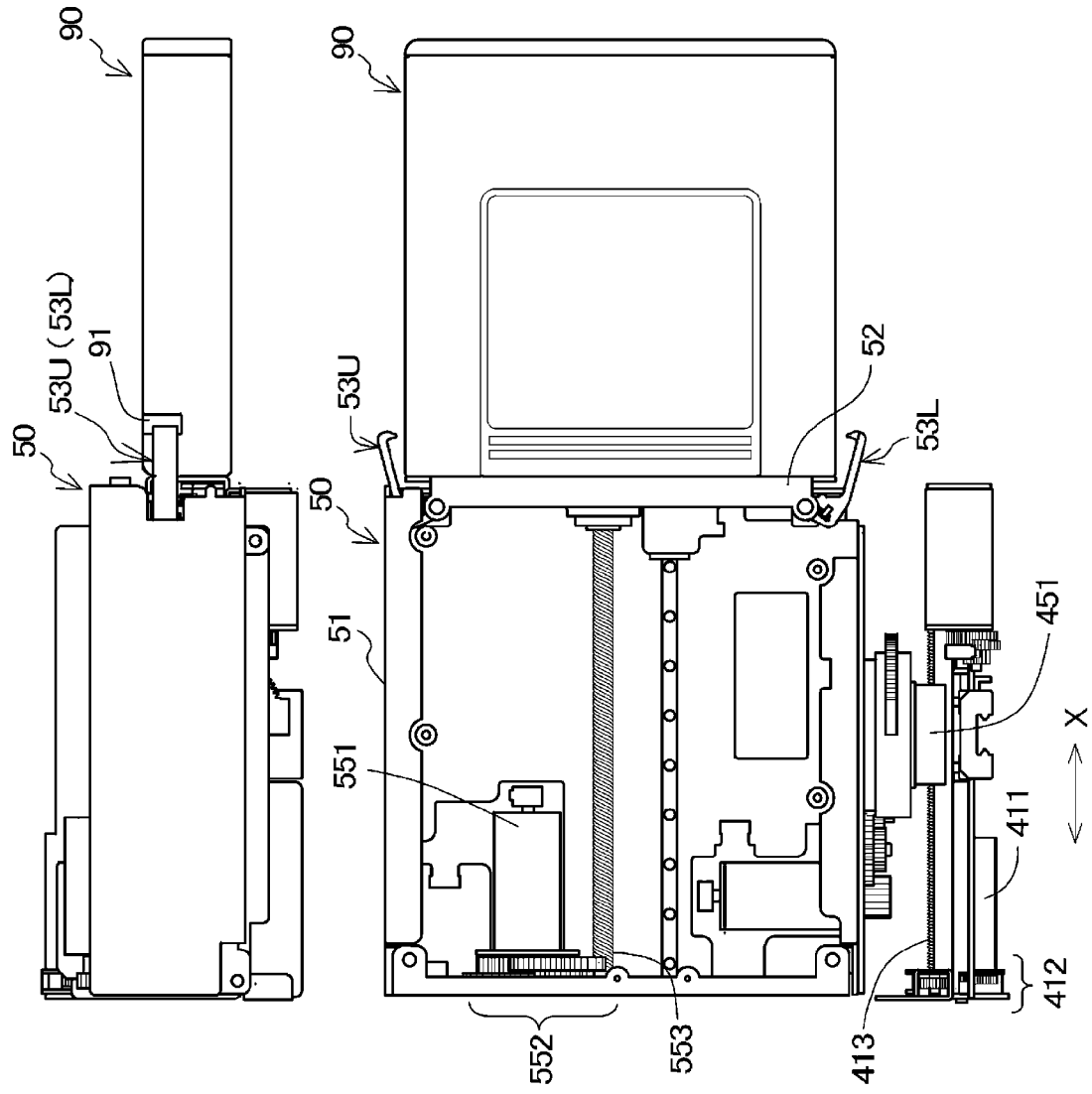

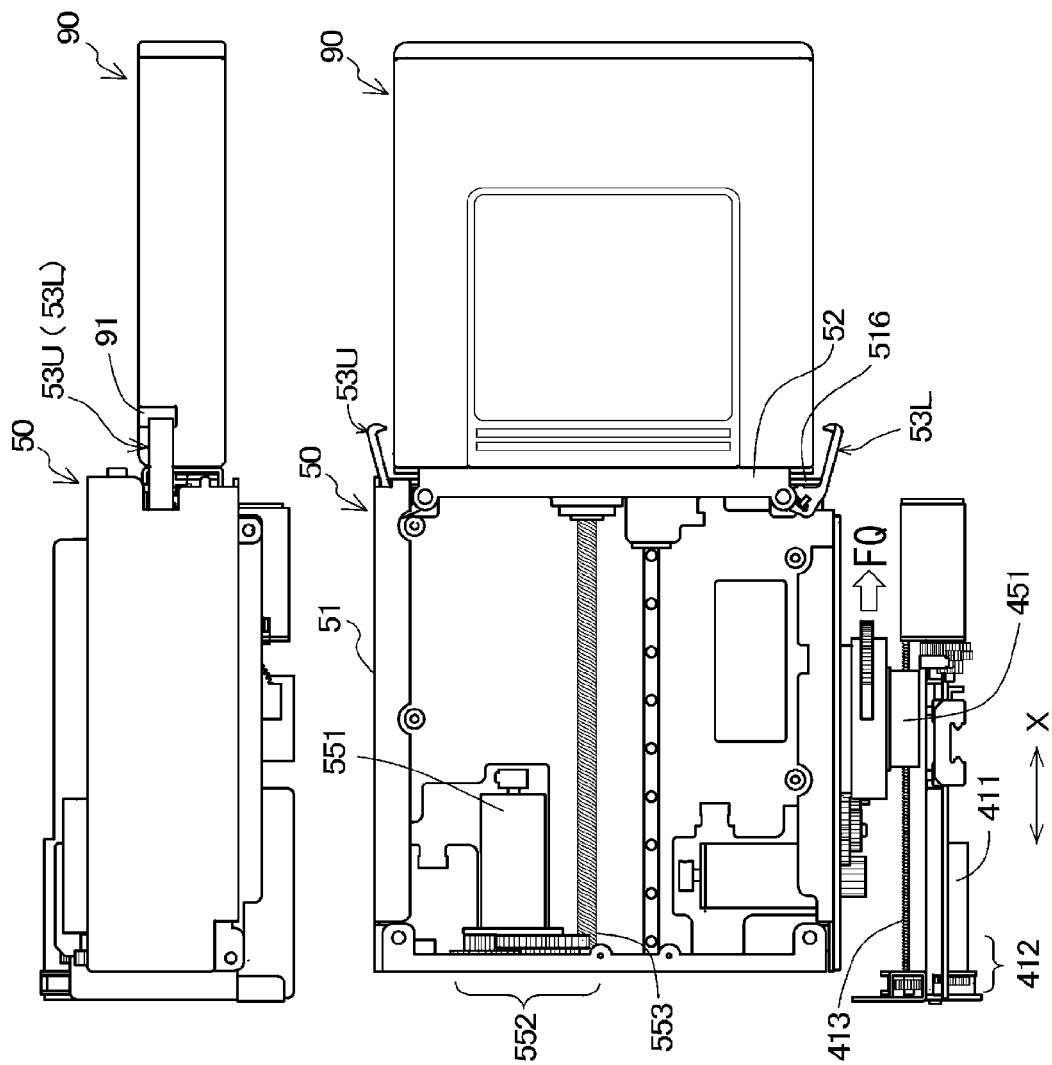

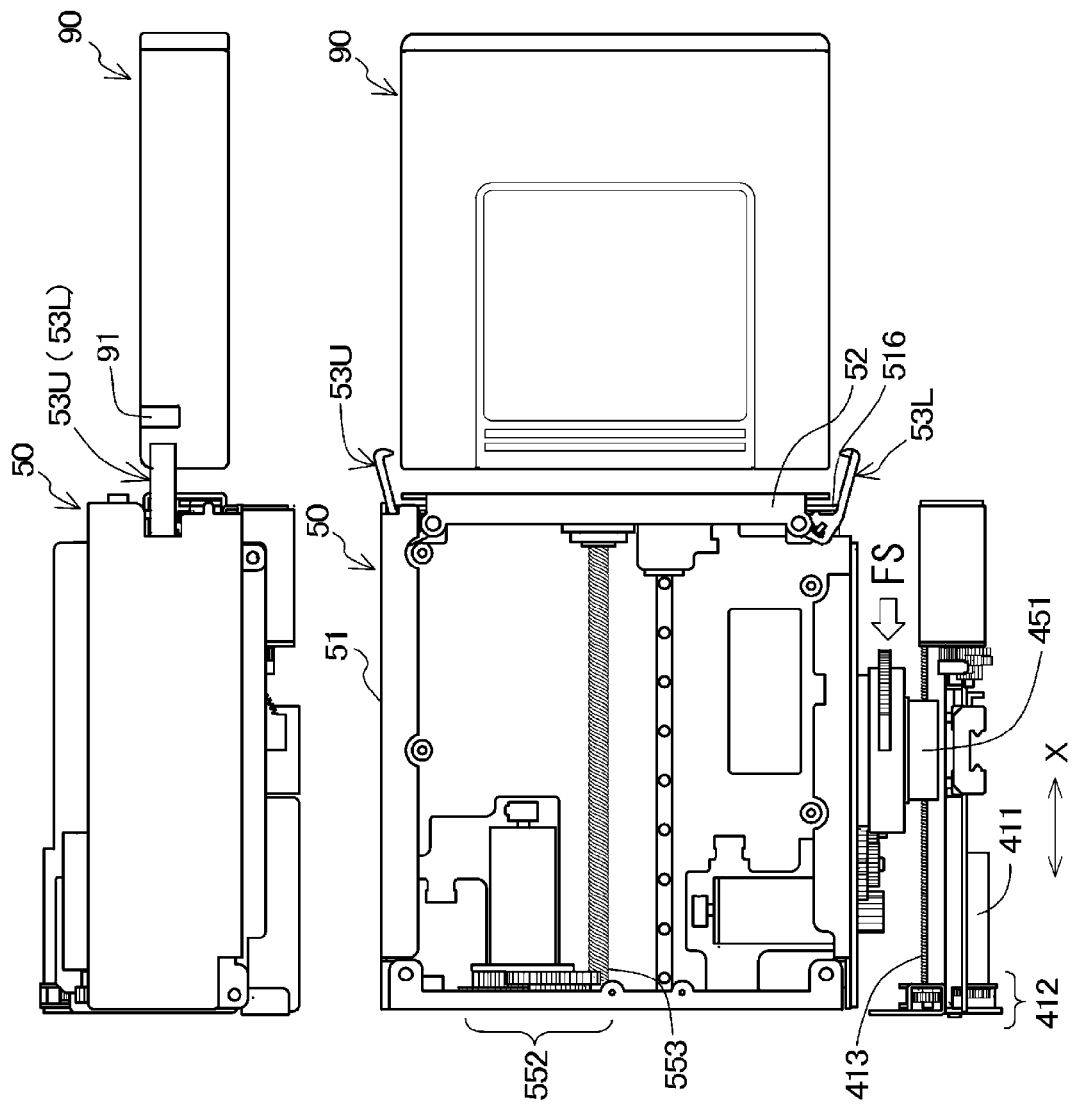

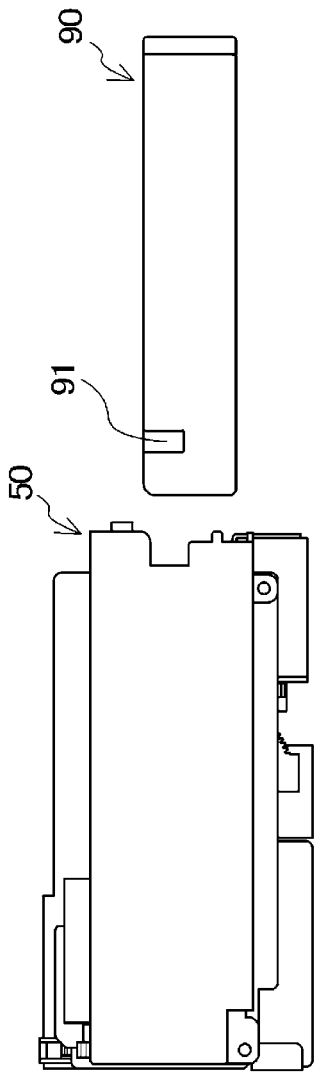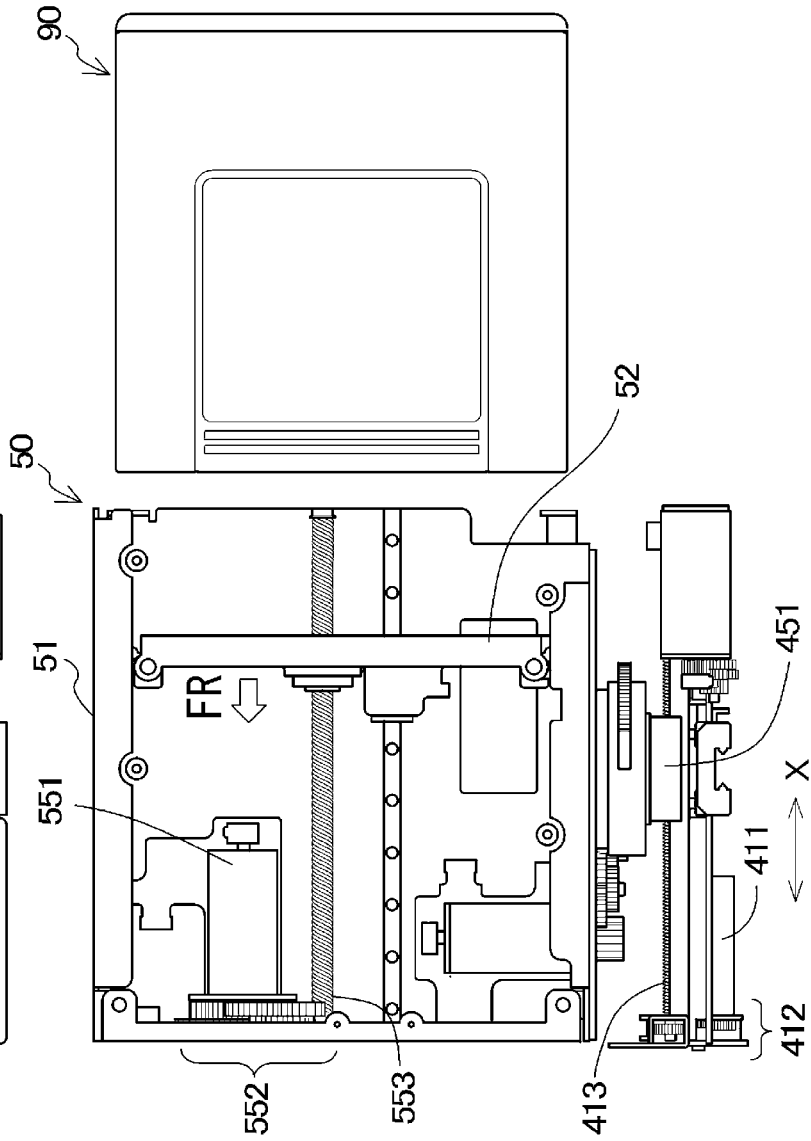
FIG.28B
FIG.28A

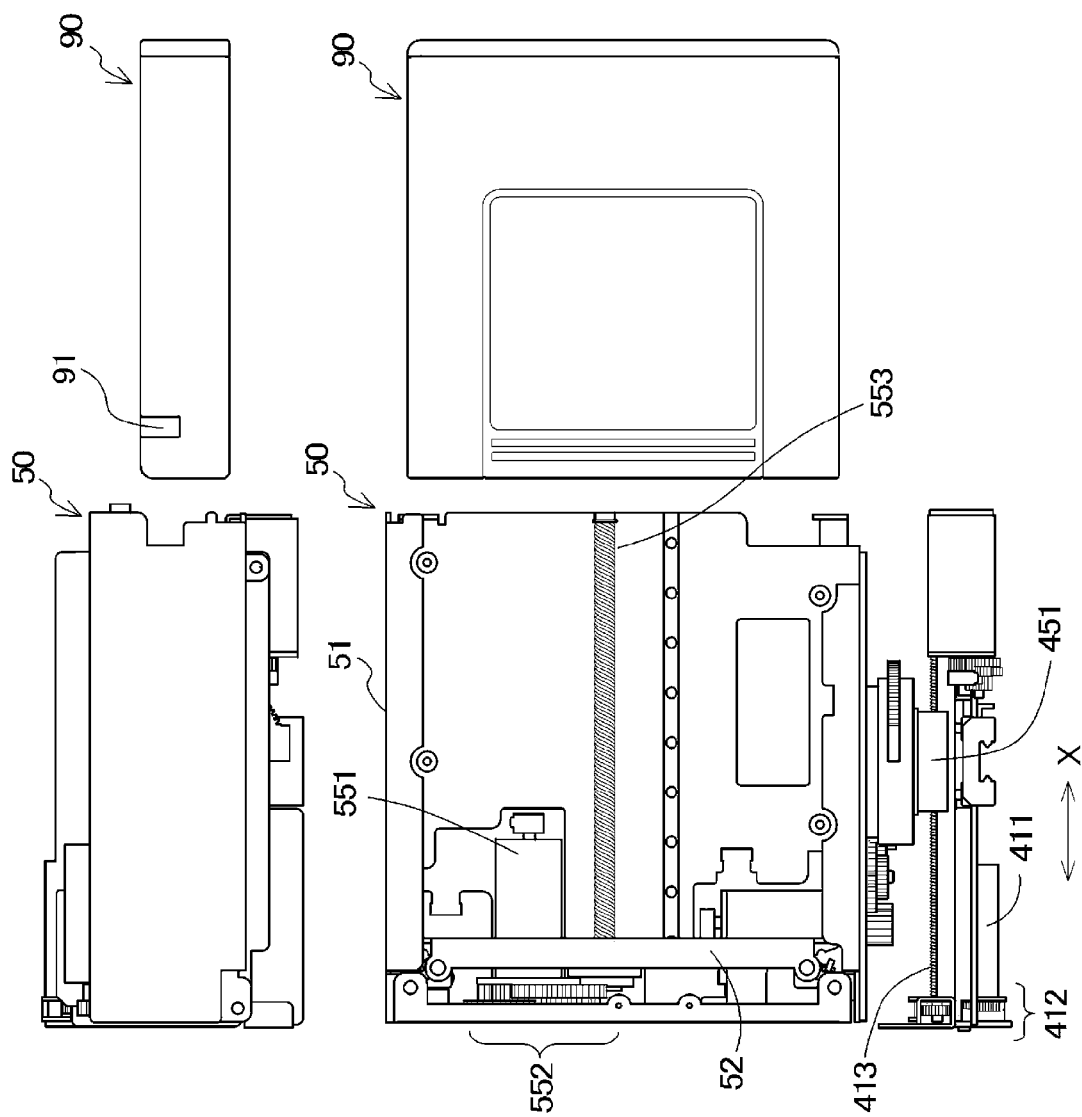

RECORDING MEDIUM DELIVERY MECHANISM AND RECORDING MEDIUM CHANGER

CROSS REFERENCE TO RELATED APPLICATIONS

This application claims the benefit of Japanese Priority Patent Application JP 2013-079870 filed Apr. 5, 2013, the entire contents of which are incorporated herein by reference.

BACKGROUND

The present disclosure relates to a recording medium delivery mechanism and a recording medium changer, by which a recording medium can be delivered with a compact configuration.

In related art, a recording medium changer has been used for storing data of content (e.g., image, music, text, or information of combination of them), various programs, and the like. In the recording medium changer, recording media or cartridges housing the recording media (hereinafter, simply referred to as "recording media") are housed in a plurality of slots (cells) provided in a casing. Further, in the recording medium changer, there is provided a conveying block that conveys the recording media between the slots (cells) and a drive block. For example, in Japanese Patent Application Laid-open No. 2009-259301 (hereinafter, will be referred to as Patent Document 1), a slider provided with a holding lever is moved in a recording medium direction and the holding lever is engaged with an engagement groove of a recording medium. The slider is further moved in an opposite direction. In this manner, housing the recording medium in the conveying block and conveying the recording medium to a desired position are performed.

SUMMARY

By the way, as in Patent Document 1, for moving the slider provided with the holding lever to a position at which the holding lever is engaged with the engagement groove of the recording medium, it is necessary to more largely slide the slider with respect to the conveying block. Therefore, the size of the recording medium in housing and discharging directions within the slider becomes large. Further, the size of the recording medium in the housing and discharging directions within the slider is large, and hence downsizing of the conveying block is difficult.

Further, in Patent Document 1, when the holding lever passes through the position of a rotation lever, a sliding pin provided to the holding lever slides on an outer holding surface and a middle holding surface of the rotation lever, the holding lever rotates, and the holding state of the recording medium is released. However, the holding lever largely rotates in a hold releasing direction, and hence the size of the recording medium in a width direction (direction orthogonal to the housing and discharging directions of the recording medium) also becomes large.

In view of this, it is desirable to provide a recording medium delivery mechanism and a recording medium changer, by which a recording medium can be delivered with a compact configuration.

According to a first embodiment of the present disclosure, there is provided a recording medium delivery mechanism including a slider, a holding lever, a biasing portion, a lever-opening operation portion, and a housing and discharging drive unit. The slider is supported on a chassis to be movable in housing and discharging directions of a recording medium. The holding lever is rotatably supported by the slider and configured to hold the recording medium. The biasing portion is configured to bias the holding lever toward the recording medium. The lever-opening operation portion is provided to the holding lever, is engaged with a lever engagement portion provided to the chassis by a movement of the slider in the discharging direction of the recording medium, and configured to rotate the holding lever in a direction away from the recording medium. The housing and discharging drive unit is configured to move the chassis and the slider in the housing and discharging directions of the recording medium.

In the embodiment of the present disclosure, the holding lever that rotatably holds the recording medium is supported by the slider that is supported on the chassis to be movable in the housing and discharging directions of the recording medium. The holding lever is biased by a biasing spring or the like toward the recording medium (e.g., in directions in which a pair of holding levers comes closer to each other). The holding lever is provided with the lever-opening operation portion. The lever-opening operation portion is engaged with the lever engagement portion provided to the chassis by the movement of the slider in the discharging direction of the recording medium. In this manner, the holding lever is rotated in a direction away from the recording medium (e.g., in directions in which the pair of holding levers move away from each other). The chassis and the slider are moved by the housing and discharging drive unit in the housing and discharging directions of the recording medium. Here, the housing and discharging drive unit performs one of housing and discharging of the recording medium by controlling a movement order and a movement amount of the chassis and the slider. Further, the housing and discharging drive unit puts the holding lever in one of a lock state and a lock released state with respect to the recording medium by controlling the movement order and the movement amount of the chassis and the slider. For example, the housing and discharging drive unit moves, when housing the recording medium, the slider in a direction of the recording medium to a position at which the lever-opening operation portion is about to be engaged with the lever engagement portion, and then moves the chassis in the direction of the recording medium, to thereby lock the holding lever with respect to the recording medium. Then, the housing and discharging drive unit returns the slider and the chassis to positions before the movement in a state in which the holding lever is locked with respect to the recording medium. In this manner, the recording medium is housed in the chassis. Further, the housing and discharging drive unit moves, when discharging the housed recording medium, the slider in the discharging direction of the recording medium, engages the lever-opening operation portion with the lever engagement portion, and rotates the holding lever in the direction away from the recording medium, to thereby release the lock state between the holding lever and the recording medium. Then, the housing and discharging drive unit moves the chassis in the discharging direction of the recording medium. After that, by returning the chassis before the movement and returning the slider to the position before the movement, discharging of the recording medium is completed.

According to a second embodiment of the present disclosure, there is provided a recording medium delivery mechanism including a plurality of slots, a drive, and a recording medium delivery mechanism. In the plurality of slots, a recording medium is housed. The drive is configured to perform an operation using the recording medium. The recording medium delivery mechanism is configured to deliver the recording medium between the plurality of slots and the drive.

The recording medium delivery mechanism includes a slider that is supported on a chassis to be movable in housing and discharging directions of a recording medium, a holding lever that is rotatably supported by the slider and configured to hold the recording medium, a biasing portion configured to bias the holding lever toward the recording medium, a lever-opening operation portion that is provided to the holding lever, is engaged with a lever engagement portion provided to the chassis by a movement of the slider in the discharging direction of the recording medium, and configured to rotate the holding lever in a direction away from the recording medium, and a housing and discharging drive unit configured to move the chassis and the slider in the housing and discharging directions of the recording medium.

According to the embodiments of the present disclosure, provided are the slider that is supported on the chassis to be movable in the housing and discharging directions of the recording medium, the holding lever that is rotatably supported by the slider and configured to hold the recording medium, the biasing portion configured to bias the holding lever toward the recording medium, the lever-opening operation portion that is provided to the holding lever, is engaged with the lever engagement portion provided to the chassis by the movement of the slider in the discharging direction of the recording medium, and configured to rotate the holding lever in the direction away from the recording medium, and the housing and discharging drive unit configured to move the chassis and the slider in the housing and discharging directions of the recording medium. Therefore, it is unnecessary to move the slider until the holding lever is locked with respect to the recording medium, and hence the movement amount of the slider can be reduced. Thus, the size of the recording medium in the housing and discharging directions can be reduced. Further, the holding lever is biased toward the recording medium. When discharging the recording medium, it is sufficient that the holding lever is rotated in the direction away from the recording medium to the position at which the lock state between the holding lever and the recording medium is released. Thus, the size of the recording medium in the width direction can be reduced. Note that the effects set forth herein are merely examples and not limited, and additional effects may be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 10A-C are views illustrating the configuration of the conveying block (when a rail portion is in a contraction state);

FIGS. 11A-C are views illustrating the configuration of the conveying block (when a rail portion is in an extension state);

FIGS. 15A-B are views for explaining the configuration and operation of the recording medium delivery block (Part 2);

FIGS. 16A-B are views illustrating holding levers;

FIGS. 18A-B are views for explaining the configuration and operation of the recording medium delivery block (Part 3);

FIGS. 19A-B are views for explaining an install operation of the recording medium (Part 1);

FIGS. 20A-B are views for explaining the install operation of the recording medium (Part 2);

FIGS. 21A-B are views for explaining the install operation of the recording medium (Part 3);

FIGS. 22A-B are views for explaining the install operation of the recording medium (Part 4);

FIGS. 23A-B are views for explaining the install operation of the recording medium (Part 5);

FIGS. 24A-B are views for explaining a discharge operation of the recording medium (Part 1);

FIGS. 25A-B are views for explaining the discharge operation of the recording medium (Part 2);

FIGS. 26A-B are views for explaining the discharge operation of the recording medium (Part 3);

FIGS. 27A-B are views for explaining the discharge operation of the recording medium (Part 4);

FIGS. 28A-B are views for explaining the discharge operation of the recording medium (Part 5); and FIGS. 29A-B are views for explaining the discharge operation of the recording medium (Part 6).

DETAILED DESCRIPTION OF EMBODIMENTS

Hereinafter, an embodiment of the present disclosure will be described with reference to the drawings. Note that descriptions will be made in the following order.

1. Configuration of Recording Medium Changer
2. Configuration of Conveying Block
3. Operation of Conveying Block
4. Configuration of Recording Medium Delivery block
4-1. Configuration of Holding Levers
4-2. Operation of Holding Levers
5. Operation of Recording Medium Delivery block <1. Configuration of Recording Medium Changer>

Figure 1:
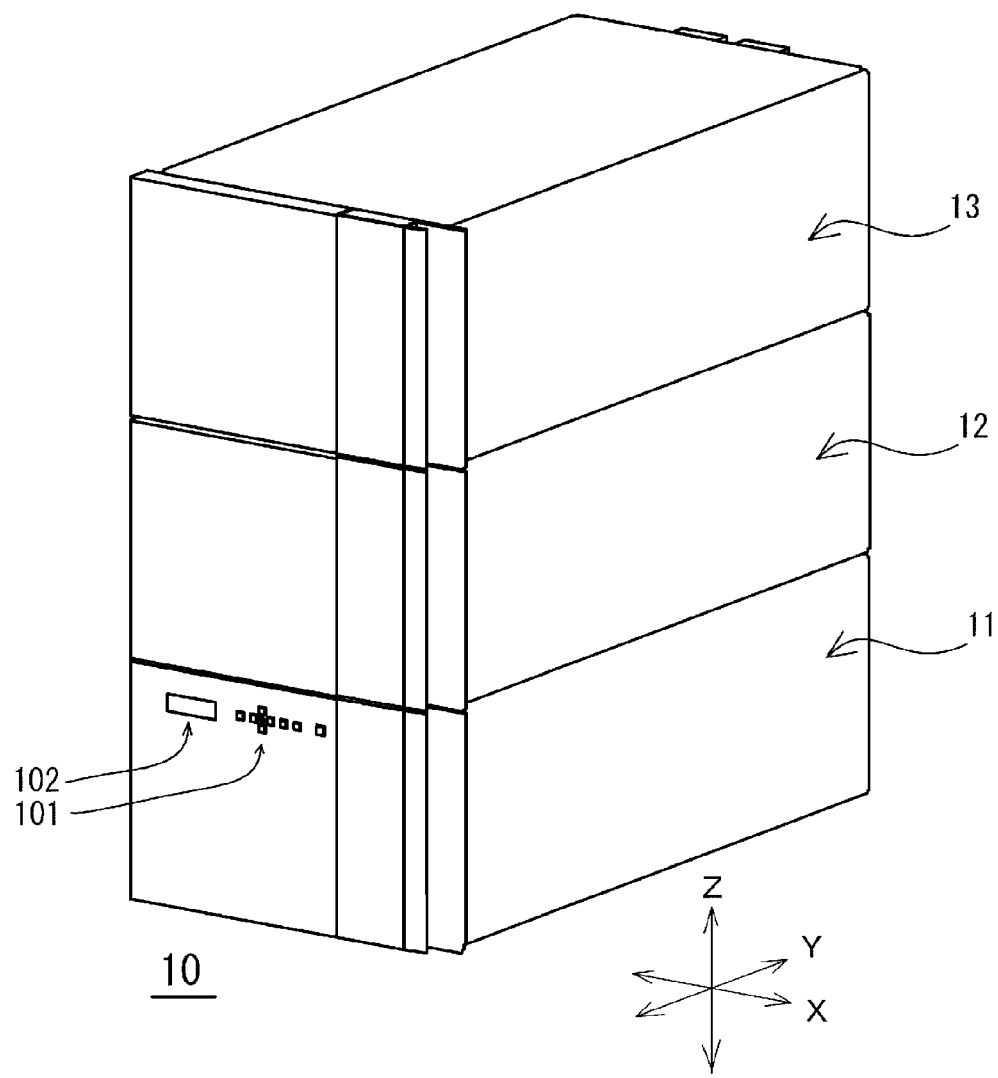
FIG. 1 is a perspective view showing an outer appearance of a recording medium changer according to an embodiment.

FIG. 1 shows an outer appearance of a recording medium changer according to an embodiment of the present disclosure. A recording medium changer 10 includes slots (cells), a drive block, a conveying block, a control block, a power-supply block, and the like. Further, in a front surface of the recording medium changer 10, there are provided an operation portion 101 and a display portion 102. The operation portion 101 includes switches or the like for performing setting and switching operations of the recording medium changer or the like. The display portion 102 displays an operation state, various types of information, and the like of the recording medium changer. Note that the description will be made referring a lateral direction of the recording medium changer 10 to as an X-direction, a depth direction to as a Y-direction, and a height direction to as a Z-direction.

The recording medium changer 10 is configured such that the slots and the drive block can be extended. For example, the recording medium changer 10 can be additionally provided with a slot by adding a slot extension unit 12 to a basic unit 11. Further, the recording medium changer 10 can be additionally provided with the drive block or with the slot and the drive block by adding a drive extension unit 13 to the basic unit 11.

Figure 2:
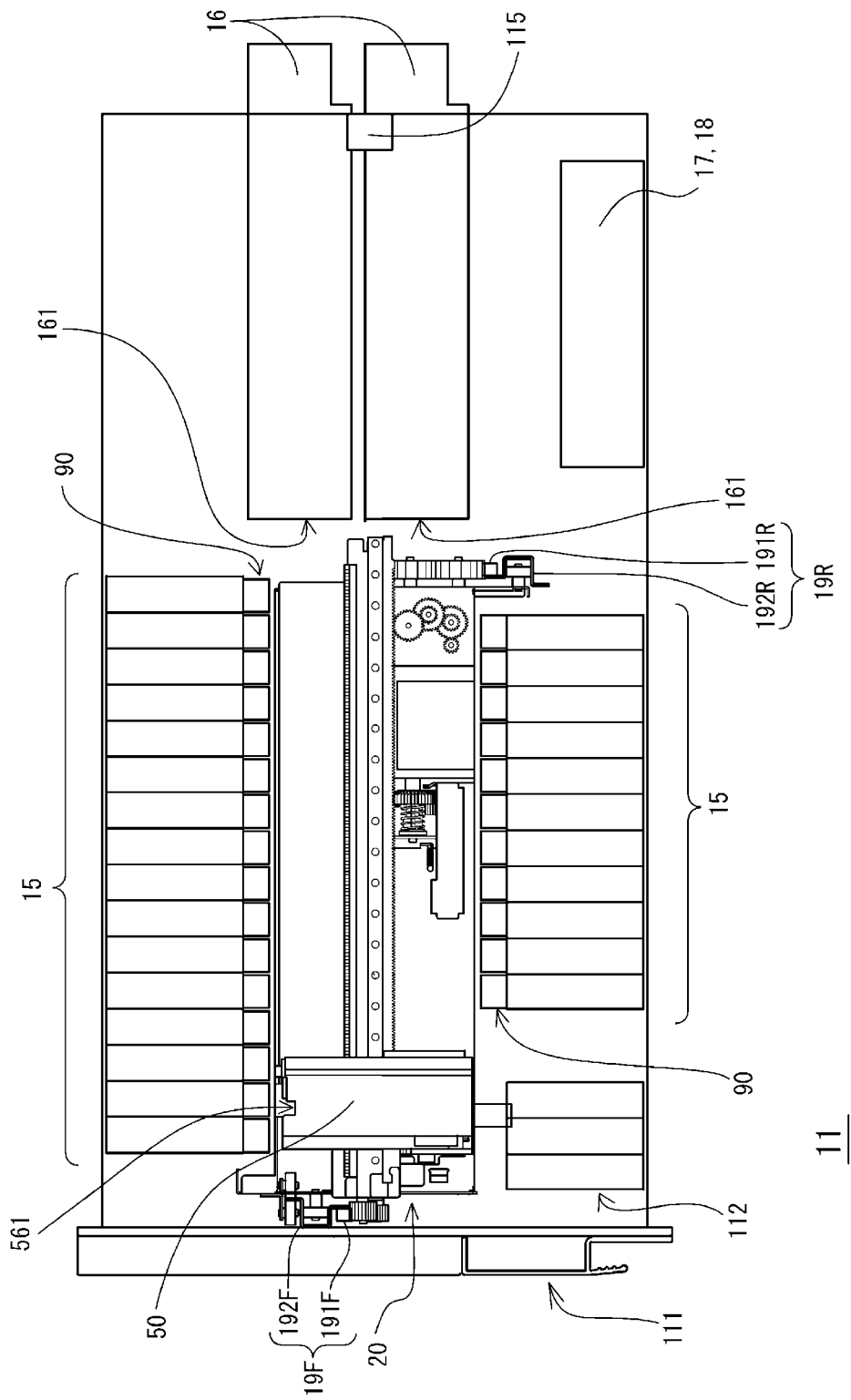
FIG. 2 is a plan view illustrating a configuration of a basic unit.

FIG. 2 is a plan view illustrating a configuration of the basic unit. The basic unit 11 includes a door 111, a recording medium relay portion 112, slots 15, drive blocks 16, a control block 17, a power-supply block 18, a conveying block 20, and the like.

The door 111 is opened and closed when a recording medium 90 is housed or discharged in/from the recording medium changer 10, such that the recording medium relay portion 112 can be pulled out.

The recording medium relay portion 112 relays the recording medium between the inside and outside of the recording medium changer 10. Specifically, when the recording medium is housed in the recording medium changer 10, the recording medium relay portion 112 holds the recording medium and moves the recording medium to the inside of the recording medium changer 10. On the other hand, when the recording medium is discharged from the recording medium changer 10, the recording medium held by the recording medium relay portion 112 is moved to the outside of the recording medium changer 10.

The slots 15 are configured to be arranged on both side surfaces of the casing, for example. Recording media are installed in the respective slots. Each slot 15 is provided such that inserting and removing directions of the recording medium 90 are in a vertical direction (X-direction) with respect to a side surface of the casing. Further, the conveying block 20 is provided to be movable in upper and lower directions (Z-direction) as will be described later between the slots 15 arranged on one side surface and the slots 15 arranged on the other side surface.

The drive blocks 16 are provided at positions on a back side with respect to the slots 15 between the slots 15 arranged on the one side surface and the slots 15 arranged on the other side surface. Further, the drive blocks 16 are provided such that recording medium insertion ports 161 are oriented to the front side (side of the conveying block 20).

The conveying block 20 includes a recording medium delivery block 50. The recording medium delivery block 50 delivers the recording media 90 between the slots 15 and the drive blocks 16. Specifically, the recording medium delivery block 50 performs processing of taking out the recording medium 90 from the slot 15 and temporarily holding the recording medium 90 and processing of mounting the held recording medium 90 on the drive block 16. Further, the recording medium delivery block 50 performs processing of taking out the recording medium 90 discharged from the drive blocks 16 and temporarily holding the recording medium 90 and processing of installing the held recording medium 90 into the slot 15.

The conveying block 20 moves the recording medium delivery block 50 in front and rear directions (Y-direction) and positions the recording medium delivery block 50 at the position of the desired slot 15 or a position corresponding to the recording medium insertion port 161 of the drive block 16. Further, when the slot extension unit 12 or the drive extension unit 13 is added, the conveying block 20 is movable in the upper and lower directions (Z-direction) such that the recording medium delivery block 50 can be positioned at a height corresponding to the desired slot 15 or drive block 16 of those units. In addition, the recording medium delivery block 50 performs a movement in the slot direction (X-direction) and a rotational movement with the upper and lower directions (Z-direction) being a rotational axis. The recording medium delivery block 50 moves in the slot direction (X-direction), to thereby change a distance from the slot 15, the recording medium 90, or the like. Further, the recording medium delivery block 50 performs a rotational movement, such that a recording medium insertion port 561 of the recording medium delivery block 50 is oriented in a direction of the slot 15 or the recording medium insertion port 161 of the drive block 16. Note that FIG. 2 illustrates a case where, when viewed in a direction of the drive block 16 from the front side of the recording medium changer 10, the recording medium insertion port 561 of the outside recording medium delivery block 50 is on a left-hand side.

The control block 17 controls the operation of the conveying block 20 and performs processing of taking out the desired recording medium 90 from the slot 15 and mounting the desired recording medium 90 on the drive block 16 and processing of returning the recording medium 90 discharged from the drive block 16 to the original slot 15. The power-supply block 18 supplies power to the drive blocks 16, the conveying block 20, and the like of the basic unit 11.

Note that the basic unit 11 is provided with a rail support portion 115 that supports a leading end of a rail portion when the rail portion to be described later is extended.

Figure 3:
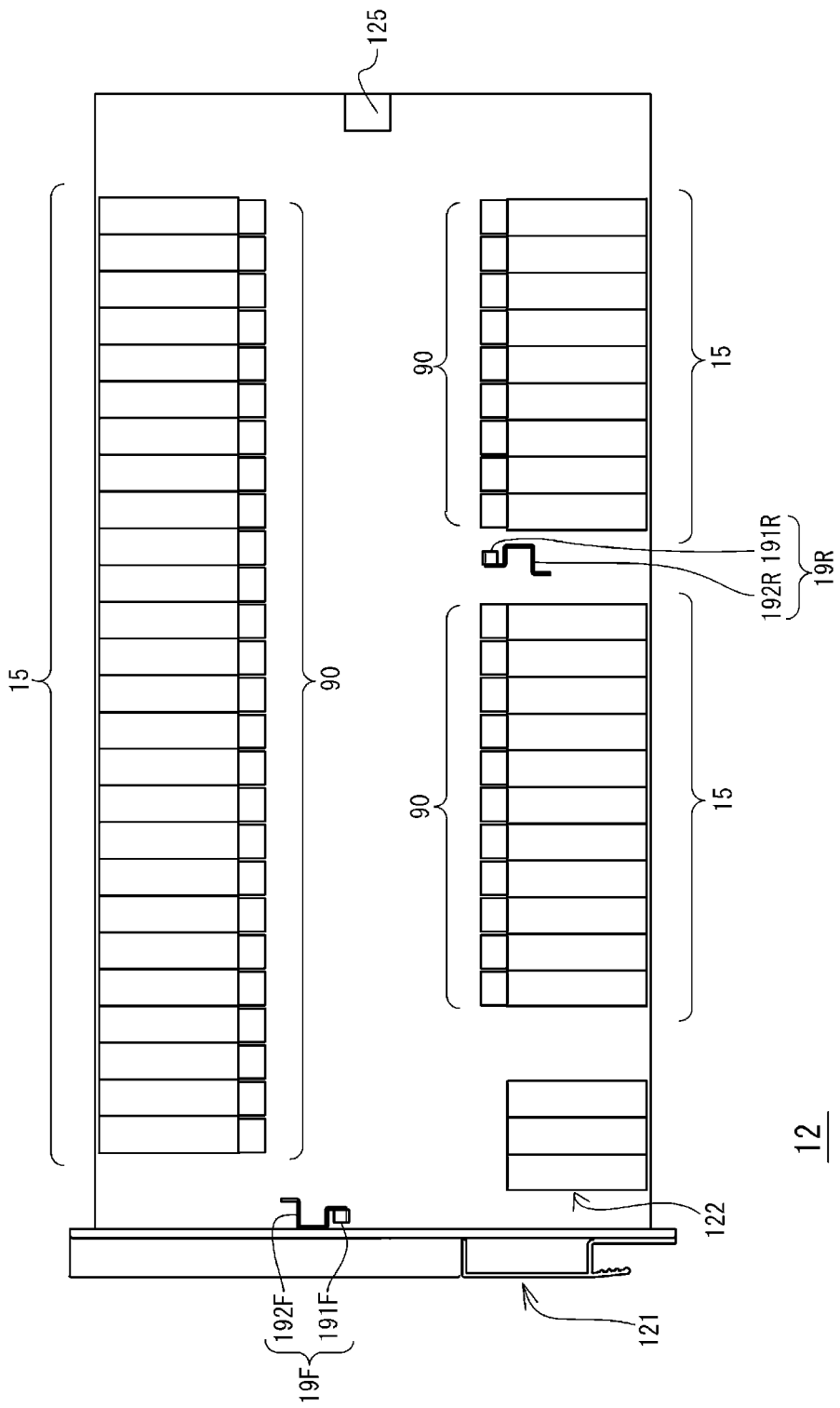
FIG. 3 is a plan view illustrating a configuration of a slot extension unit.

FIG. 3 is a plan view illustrating a configuration of the slot extension unit. The slot extension unit 12 includes a door 121, a recording medium relay portion 122, slots 15, and the like.

The door 121 is opened and closed when a recording medium 90 is housed or discharged in/from the recording medium changer 10, such that the recording medium relay portion 122 can be pulled out.

The recording medium relay portion 122 relays the recording medium between the inside and outside of the recording medium changer 10. Specifically, when the recording medium is housed in the recording medium changer 10, the recording medium relay portion 122 holds the recording medium and moves the recording medium to the inside of the recording medium changer 10. On the other hand, when the recording medium is discharged from the recording medium changer 10, the recording medium held by the recording medium relay portion 122 is moved to the outside of the recording medium changer 10.

The slots 15 are, for example, configured to be arranged in a grid form on both side surfaces of a casing. The recording media are installed into the slots. Each slot 15 is provided such that the inserting and removing directions of the recording medium 90 are in the vertical direction (X-direction) with respect to side surfaces of the casing. Further, between the slots 15 arranged on the one side surface and the slots 15 arranged on the other side surface, there is provided a space that enables the conveying block 20 to be movable in the upper and lower directions (Z-direction) when the slot extension unit 12 is added to the basic unit 11.

Note that the slot extension unit 12 is provided with a rail support portion 125 that supports a leading end of a rail portion when the rail portion to be described later is extended.

Figure 4:
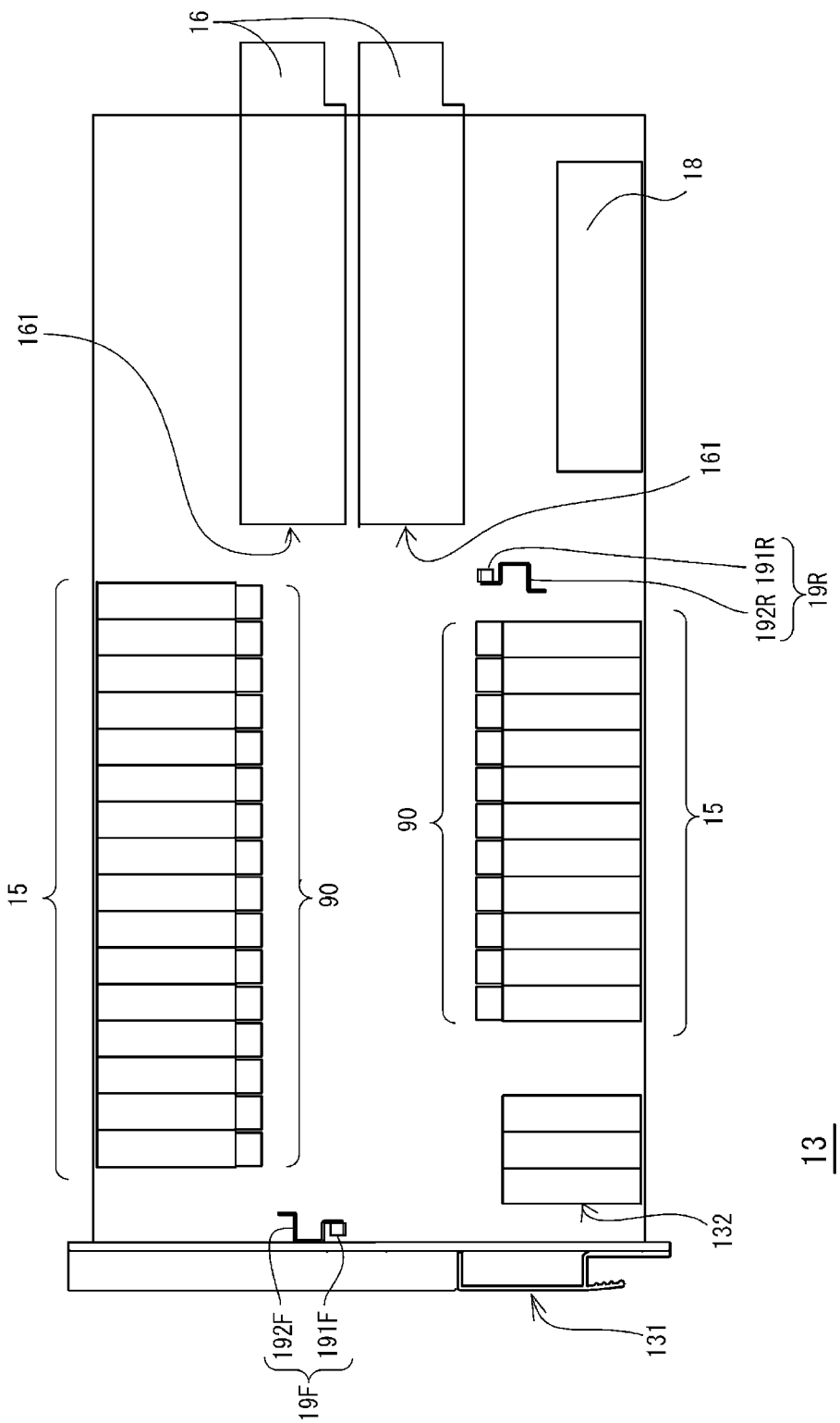
FIG. 4 is a plan view illustrating a configuration of a drive extension unit.

FIG. 4 is a plan view illustrating a configuration of the drive extension unit. The drive extension unit 13 includes a door 131, a recording medium relay portion 132, slots 15, drive blocks 16, and a power-supply block 18.

The door 131 is opened and closed when a recording medium 90 is housed or discharged in/from the recording medium changer 10, such that the recording medium relay portion 132 can be pulled out.

The recording medium relay portion 132 relays the recording medium between the inside and outside of the recording medium changer 10. Specifically, when the recording medium is housed in the recording medium changer 10, the recording medium relay portion 132 holds the recording medium and moves the recording medium to the inside of the recording medium changer 10. On the other hand, when the recording medium is discharged from the recording medium changer 10, the recording medium held by the recording medium relay portion 132 is moved to the outside of the recording medium changer 10.

The slots 15 are, for example, configured to be arranged in a grid form on both side surfaces of a casing. The recording media are installed into the slots. Each slot 15 is provided such that the inserting and removing directions of the recording medium 90 are in the vertical direction (X-direction) with respect to side surfaces of the casing. Further, between the slots 15 arranged on one side surface and the slots 15 arranged on the other side surface, there is provided a space that enables the conveying block 20 to be movable in the upper and lower directions (Z-direction) when the drive extension unit 13 is added to the basic unit 11.

The drive blocks 16 are provided at positions on a back side with respect to the slots 15 between the slots 15 arranged on the one side surface and the slots 15 arranged on the other side surface. Further, the drive blocks 16 are provided such that recording medium insertion ports 161 are oriented to the front side (side of the conveying block 20). The power-supply block 18 supplies power to the drive blocks 16 and the like of the drive extension unit 13.

The basic unit 11, the slot extension unit 12, and the drive extension unit 13 are provided with a guide mechanism 19 for making the conveying block 20 movable over the units, for example, a rack 191 and a guide plate 192. The recording medium changer 10 uses the guide mechanism 19 to move the conveying block 20 to a position not only in the basic unit 11 but also in the slot extension unit 12 and the drive extension unit 13. Therefore, the recording medium changer 10 can convey the recording medium 90 installed in one of the slot 15 in any one of the basic unit 11, the slot extension unit 12, and the drive extension unit 13 to one of the drive blocks 16 of the basic unit 11 and the drive extension unit 13. Further, the recording medium changer 10 can return the recording medium discharged from the drive block 16 to the original slot 15.

Further, the recording medium changer 10 conveys the recording media 90 between the slots 15 and the recording medium relay portions 112, 122, and 132. In this manner, installing the recording media into the recording medium changer 10 and discharging the installed recording media can be performed.

Figure 5:
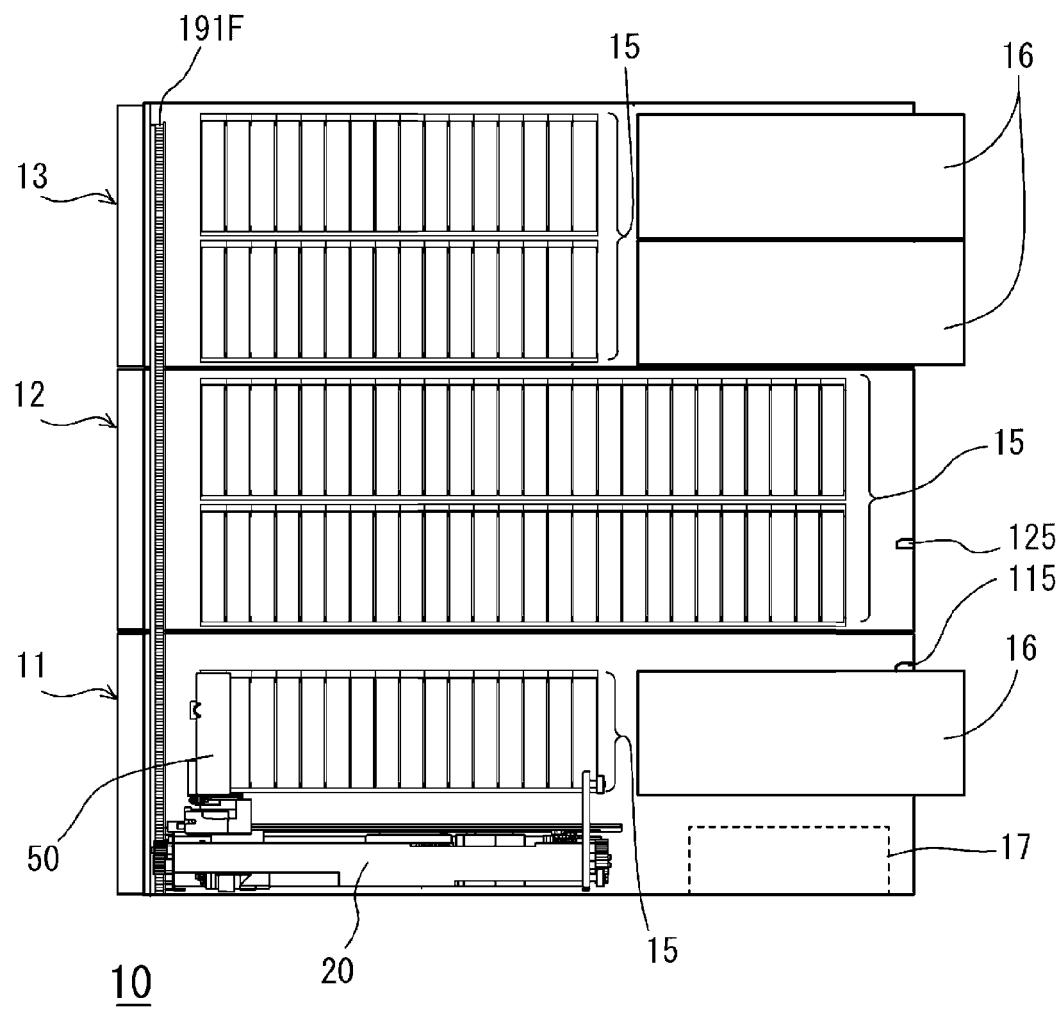
FIG. 5 is an inner side view illustrating a configuration of the recording medium changer when the basic unit, the slot extension unit, and the drive extension unit are used (when a conveying block is positioned at a position of the basic unit)
Figure 6:
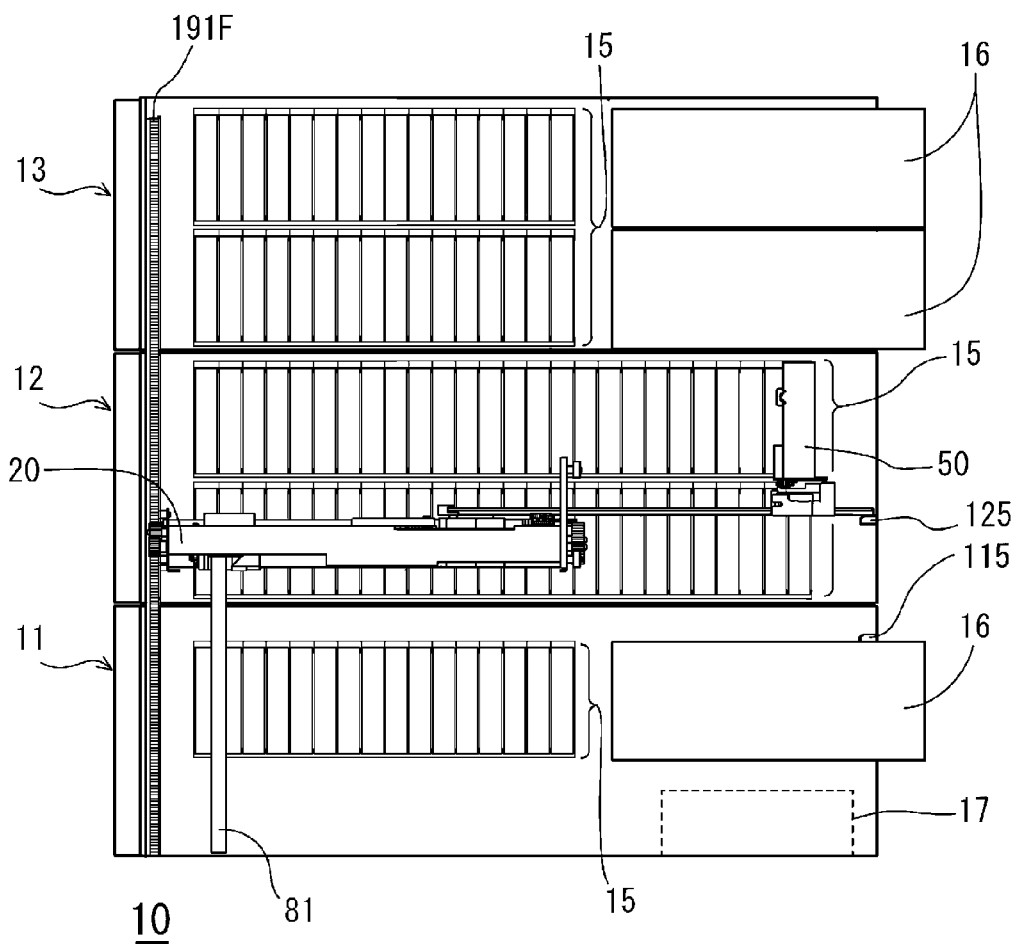
FIG. 6 is an inner side view illustrating a configuration of the recording medium changer when the basic unit, the slot extension unit, and the drive extension unit are used (when a conveying block is positioned at a position of the slot extension unit)
Figure 7:
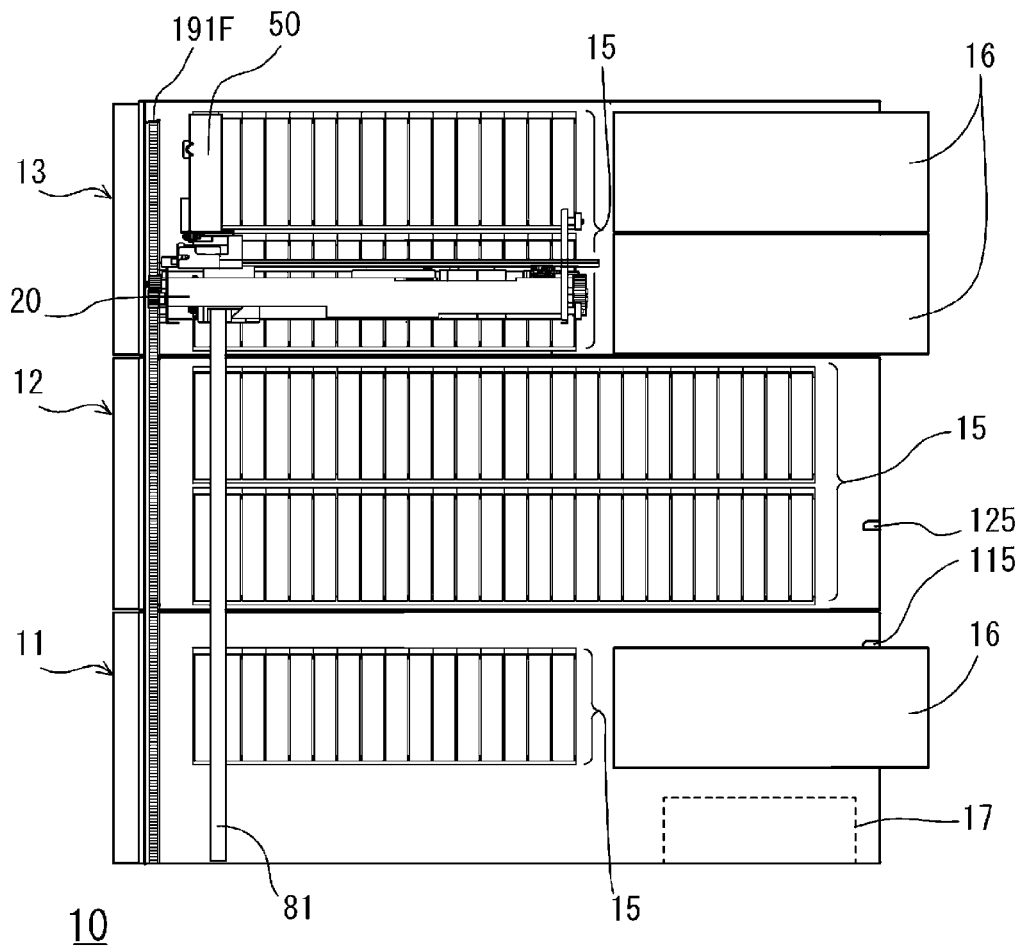
FIG. 7 is an inner side view illustrating a configuration of the recording medium changer when the basic unit, the slot extension unit, and the drive extension unit are used (when a conveying block is positioned at a position of the drive extension unit)

FIGS. 5 to 7 are inner side views each illustrating a configuration of the recording medium changer when the basic unit, the slot extension unit, and the drive extension unit are used. Note that FIG. 5 shows a case where the conveying block is positioned at the position of the basic unit. FIG. 6 shows a case where the conveying block is positioned at the position of the slot extension unit. FIG. 7 shows a case where the conveying block is positioned at a position of the drive extension unit.

The recording medium changer 10 delivers the recording medium 90 between the slot 15 of the basic unit 11 and the recording medium delivery block 50. In this case, as shown in FIG. 5, the recording medium changer 10 moves the conveying block 20 in a direction (Z-direction) such that the recording medium delivery block 50 is at a height of the desired slot 15 by the use of the rack 191. Further, the recording medium changer 10 moves the recording medium delivery block 50 in the depth direction (Y-direction) such that the recording medium delivery block 50 is at a position to be opposed to the desired slot 15.

Further, the recording medium changer 10 delivers the recording medium 90 between the slot 15 of the slot extension unit 12 and the recording medium delivery block 50. In this case, as shown in FIG. 6, the recording medium changer 10 moves the conveying block 20 by the use of the rack 191 in a direction (Z-direction) such that the recording medium delivery block 50 is at a height of the desired slot. Further, the recording medium changer 10 moves the recording medium delivery block 50 in the depth direction (Y-direction) such that the recording medium delivery block 50 is at a position to be opposed to the desired slot 15. Note that, a rail portion 31 can be extended and contracted such that the conveying block 20 can move the recording medium delivery block 50 to the position to be opposed to the desired slot. Here, as shown in FIG. 6, when the rail portion 31 is extended and contracted, the leading end of the rail portion 31 is supported by the rail support portion 125.

Further, the recording medium changer 10 delivers the recording medium 90 between the slot 15 of the drive extension unit 13 and the recording medium delivery block 50. In this case, as shown in FIG. 7, the recording medium changer 10 moves the conveying block 20 by the use of the rack 191 in a direction (Z-direction) such that the recording medium delivery block 50 is at a height of the desired slot. Further, the recording medium changer 10 moves the recording medium delivery block 50 in the depth direction (Y-direction) such that the recording medium delivery block 50 is at a position to be opposed to the desired slot.

Further, the conveying block 20 is connected to the control block 17 and the power-supply block 18 of the basic unit 11 via a cable 81. Communication and power supply are performed via the cable 81.

Note that the recording medium changer 10 is not limited to be configured using the basic unit 11, the slot extension unit 12, and the drive extension unit 13 as described above. For example, the recording medium changer 10 may be configured using a casing with a predetermined size and an area corresponding to the basic unit and an area(s) corresponding to the slot extension unit and/or the drive extension unit may be provided in the casing.

<2. Configuration of Conveying Block>

Figure 8:
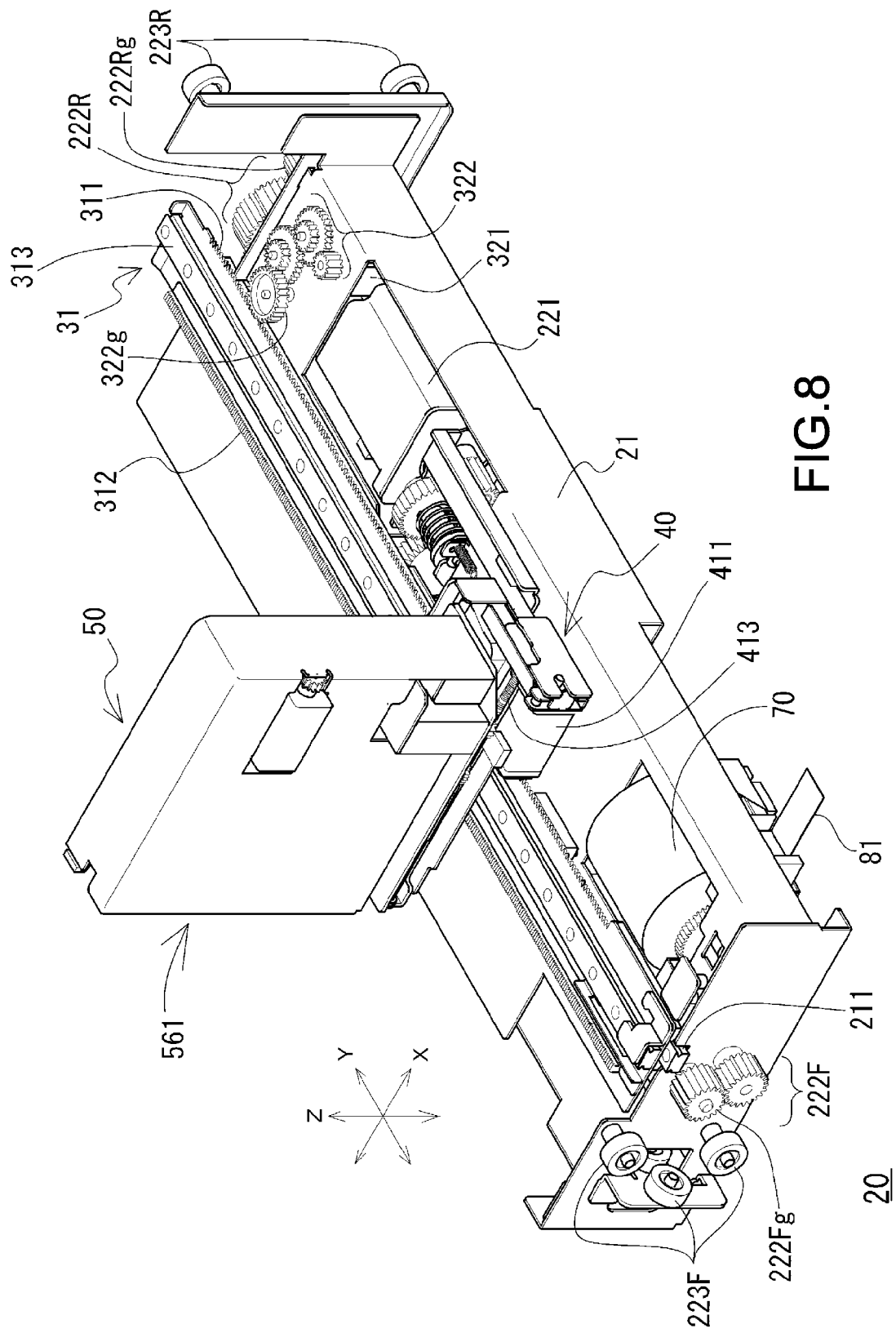
FIG. 8 is a perspective view illustrating a configuration of the conveying block (when viewed from a front side)
Figure 9:
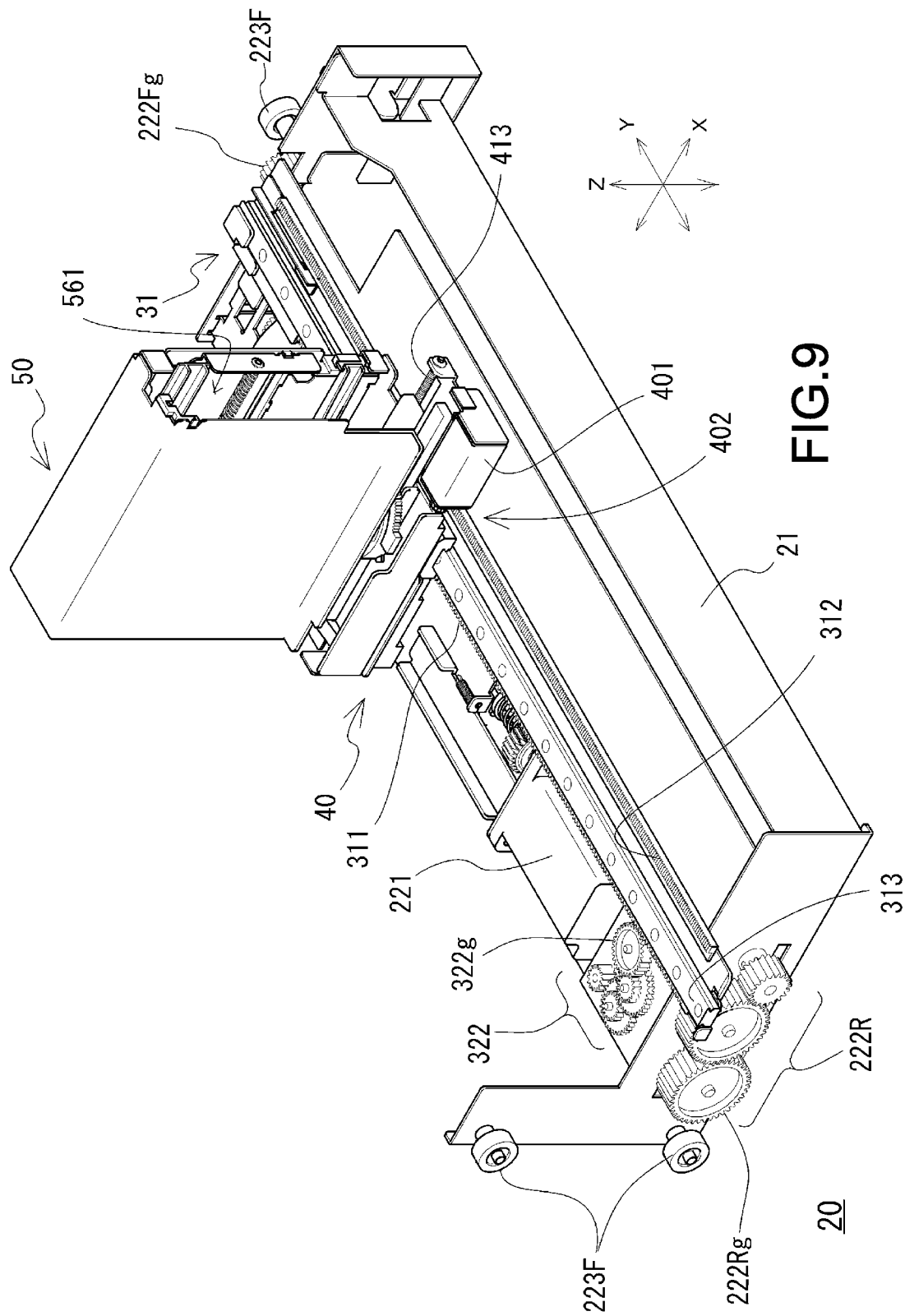
FIG. 9 is a perspective view illustrating the configuration of the conveying block (when viewed from a back side)
Figure 12:
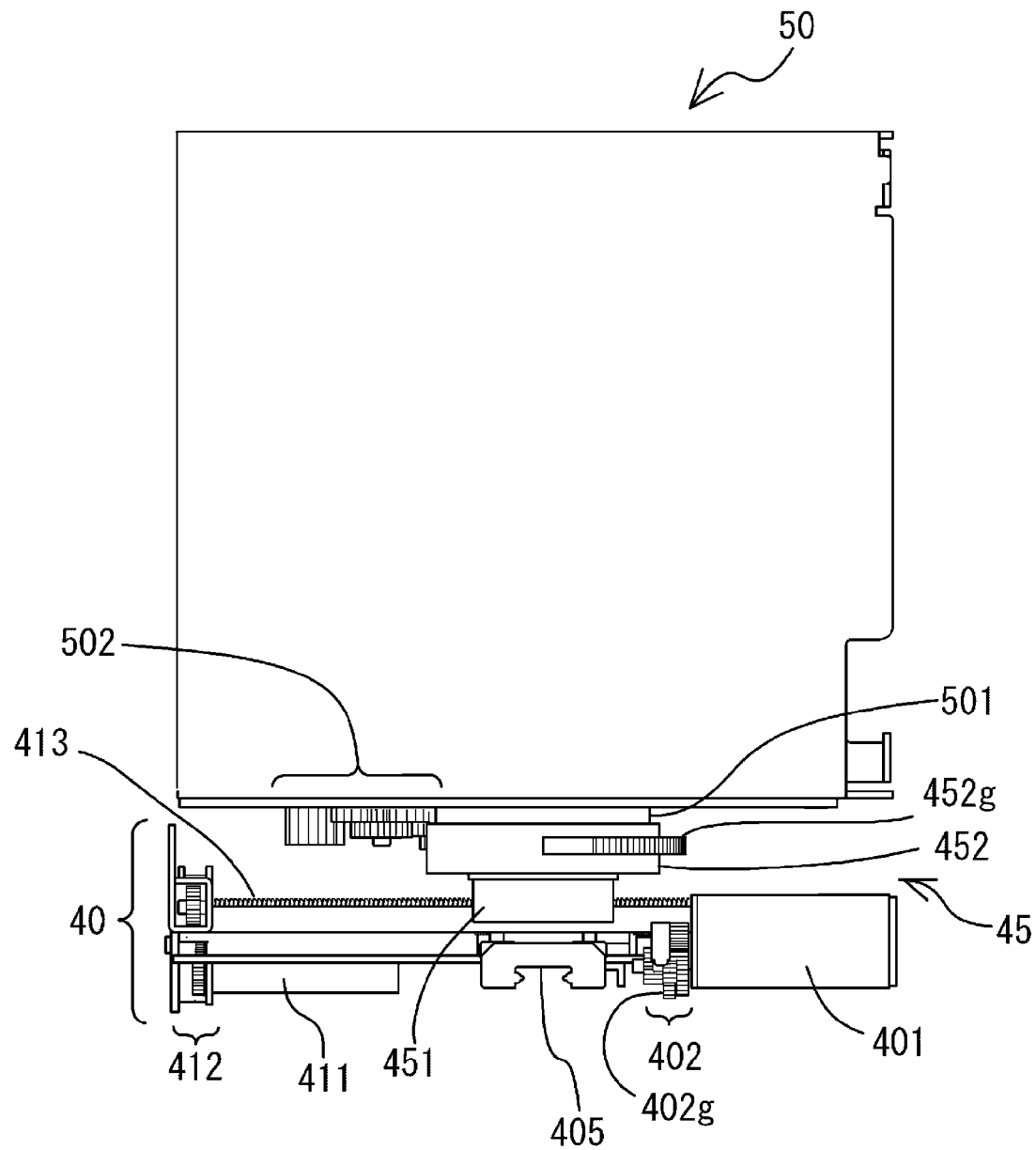
FIG. 12 is a view of a support portion of a recording medium delivery block when viewed from a back side of the recording medium changer.

Next, a configuration of the conveying block 20 will be described. FIGS. 8 and 9 are perspective views each illustrating the configuration of the conveying block 20. Note that FIG. 8 is a perspective view when the conveying block 20 is viewed from the front side of the recording medium changer 10 and FIG. 9 is a perspective view when the conveying block 20 is viewed from the back side of the recording medium changer 10. FIGS. 10A-C and 11A-C are views each illustrating the configuration of the conveying block. FIGS. 10A-C show a case where the rail portion is in a contraction state. FIGS. 11A-C show a case where the rail portion is in an extension state. Note that FIGS. 10A and 11A show plan views, FIGS. 10B and 11B show right side view, and FIGS. 10C and 11C show lower view. FIG. 12 is a view of a support portion of the recording medium delivery block 50 when viewed from the back side of the recording medium changer 10.

A conveying-block chassis 21 of the conveying block 20 is provided with a conveying-block movement mechanism, a rail portion, and a rail movement mechanism.

The conveying-block movement mechanism includes a conveying-block moving motor 221, drive transmission portions 222F and 222R, guide rollers 223F and 223R, and the like.

The conveying-block moving motor 221 generates a driving force for moving the conveying block 20 in the upper and lower directions (Z-direction). The drive transmission portion 222F includes, for example, a plurality of gears. A driven gear (pinion) 222Fg is provided to mesh with a rack 191F of a guide portion 19F provided to the basic unit 11, the slot extension unit 12, and the drive extension unit 13. The drive transmission portion 222R includes, for example, a plurality of gears. A driven gear (pinion) 222Rg is provided to mesh with a rack 191R of a guide portion 19R provided to the basic unit 11, the slot extension unit 12, and the drive extension unit 13. Therefore, the conveying block 20 moves in the upper and lower directions by the driven gears (pinions) 222Fg and 222Rg of the drive transmission portions 222F and 222R being rotated by the conveying-block moving motor 221.

A pair of the guide rollers 223F sandwiches a guide plate 192F of the guide portion 19F. Further, the other guide rollers 223F move in guide grooves of the guide plate 192F. The guide rollers 223R move in guide grooves of a guide plate 192R of the guide portion 19R. Therefore, the conveying block 20 is positioned at a correct position by the guide rollers 223F and 223R when the conveying block 20 is moved in the upper and lower directions.

In a side surface of the rail portion 31, a rack 311 for driving the rail portion 31 in a rail longitudinal direction (Y-direction) is formed. In a surface of the rail portion 31 on a side of the recording medium delivery block, a rack 312 and a guide 313 for moving a recording medium delivery block base 40 to be described later in the rail longitudinal direction (Y-direction) are formed. On an opposite surface side of the rail portion 31, a guide receiving portion (not shown) is formed. The guide receiving portion is fitted onto a slide guide 211 provided to the conveying-block chassis 21 to extend in the rail longitudinal direction (Y-direction) so as to hold slide guide 211, and holds the rail portion 31 to be able to be extended and contracted in the rail longitudinal direction (Y-direction). The rack 311 mesh with a driven gear (pinion) 322g of a drive transmission portion 322 forming part of the rail movement mechanism. Further, the rack 312 meshes with a driven gear (pinion) 402g of a drive transmission portion 402 forming part of a recording medium delivery block base movement mechanism to be described later.

The rail movement mechanism includes a rail moving motor 321 attached to the conveying-block chassis 21, the drive transmission portion 322, the rack 311 of the rail portion 31, and the like.

The rail moving motor 321 generates a driving force for moving the rail portion 31 in the rail longitudinal direction (Y-direction). The drive transmission portion 322 includes, for example, a plurality of gears. A driven gear (pinion) 322g meshes with the rack 311 of the rail portion 31. Therefore, the rail portion 31 moves in the rail longitudinal direction (Y-direction) by the driven gear (pinion) 322g of the drive transmission portion 322 being rotated by the rail moving motor 321. At this time, the guide receiving portion of the rail portion 31 slides in a state of being fitted onto the slide guide 211.

The rail portion 31 is provided with the recording medium delivery block base 40 that moves on the rail in the rail longitudinal direction (Y-direction). The recording medium delivery block base 40 is provided with a recording medium delivery block holding portion 45 that holds the recording medium delivery block 50 to be rotatable with the upper and lower directions (Z-direction) being an axis. Further, the recording medium delivery block holding portion 45 is provided to be movable in a direction (X-direction) orthogonal to the rail longitudinal direction (Y-direction) with respect to the recording medium delivery block base 40.

Further, the conveying block 20 includes the recording medium delivery block base movement mechanism, a recording medium delivery block holding portion movement mechanism, and a recording medium delivery block rotation mechanism.

The recording medium delivery block base movement mechanism moves the recording medium delivery block base 40 in the rail longitudinal direction (Y-direction). The recording medium delivery block base movement mechanism includes a recording medium delivery block base movement motor 401 and the drive transmission portion 402, which are attached to the recording medium delivery block base 40, the rack 311 of the rail portion 31, and the like.

The recording medium delivery block base movement motor 401 generates a driving force for moving the recording medium delivery block base 40 in the rail longitudinal direction (Y-direction). As shown in FIG. 12, the drive transmission portion 402 includes, for example, a plurality of gears. A driven gear (pinion) 402g meshes with the rack 312 of the rail portion 31 shown in FIG. 8 or the like. Further, the recording medium delivery block base 40 is provided with a guide receiving portion 405 shown in FIG. 12. The guide receiving portion 405 is fitted onto the guide 313 of the rail portion 31 to hold the guide 313 of the rail portion 31. Therefore, the recording medium delivery block base 40 moves on the rail portion in the rail longitudinal direction (Y-direction) by the driven gear (pinion) 402g of the drive transmission portion 402 being rotated by the recording medium delivery block base movement motor 401. At this time, the guide receiving portion 405 of the recording medium delivery block base 40 slides in a state of being fitted onto the guide 313.

The recording medium delivery block holding portion movement mechanism moves the recording medium delivery block holding portion 45 in a direction (X-direction) orthogonal to the rail longitudinal direction (Y-direction) with respect to the recording medium delivery block base 40. The recording medium delivery block holding portion movement mechanism includes a holding portion moving motor 411, a drive transmission portion 412, and a feed screw 413, which are attached to the recording medium delivery block base 40, a nut provided to the recording medium delivery block holding portion 45, and the like.

The holding portion moving motor 411 shown in FIG. 12 generates a driving force for moving the recording medium delivery block holding portion 45 in a direction orthogonal to the rail longitudinal direction with respect to the recording medium delivery block base 40. The drive transmission portion 412 includes, for example, a plurality of gears. A driven gear is provided with the feed screw 413 with rotational axe thereof corresponding to each other. Therefore, the nut 451 of the recording medium delivery block holding portion 45 moves in an axis direction of the feed screw 413 by the driven gear of the drive transmission portion 412 being rotated by the holding portion moving motor 411.

The nut 451 of the recording medium delivery block holding portion 45 is provided with a cylindrical bearing portion 452. Further, a tooth portion 452g is formed in an outer peripheral surface of the bearing portion 452.

A rotational shaft 501 of the recording medium delivery block 50 is inserted into the bearing portion 452 of the recording medium delivery block holding portion 45 and rotatably supported by the recording medium delivery block holding portion 45.

The recording medium delivery block 50 includes the recording medium delivery block rotation mechanism for rotating the recording medium delivery block 50 with the rotational shaft 501 being a center. The recording medium delivery block rotation mechanism includes a recording medium delivery block rotational drive motor (not shown) and a drive transmission portion 502, which are attached to the recording medium delivery block 50, the bearing portion 452 of the recording medium delivery block holding portion 45, and the like.

The recording medium delivery block rotational drive motor generates a driving force for rotating the recording medium delivery block 50. The drive transmission portion 502 includes, for example, a plurality of gears. A driven gear meshes with the tooth portion 452g of the bearing portion 452. Therefore, the recording medium delivery block 50 rotates with the rotational shaft 501 being a center by the driven gear of the drive transmission portion 502 being rotated by the recording medium delivery block rotational drive motor.

Further, the conveying block 20 includes a cable processing block 70. When the conveying block 20 is moved in the upper and lower directions by the conveying-block movement mechanism, winding in and out the cable 81 are performed by the cable processing block 70.

Note that the rail movement mechanism, the recording medium delivery block base movement mechanism, the recording medium delivery block holding portion movement mechanism, and the recording medium delivery block rotation mechanism in the conveying block 20 are not limited to the above-mentioned configurations. For example, the drive transmission portion is not limited to including the plurality of gears and other configurations may be adopted. Further, the motor may be provided on other component side or the like.

<3. Operation of Conveying Block>

Figure 13:
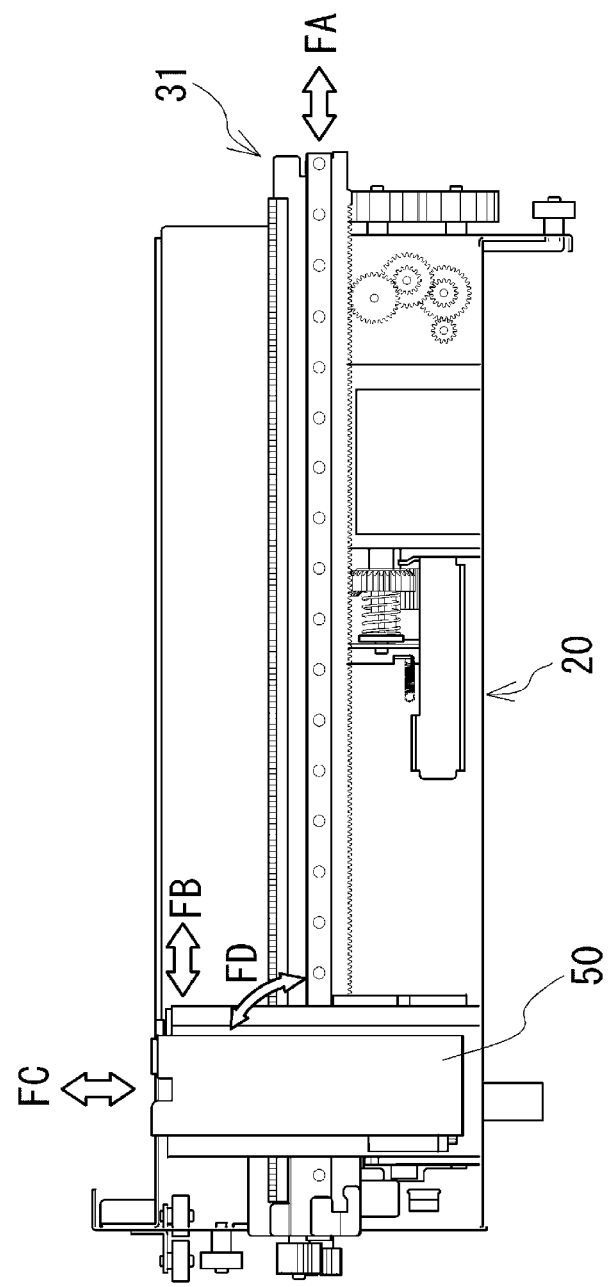
FIG. 13 is a view for explaining an operation of the conveying block.

FIG. 13 is a view for explaining an operation of the conveying block. The conveying block 20 can move the rail portion 31 through the above-mentioned rail movement mechanism in arrow FA-directions. The conveying block 20 can move the recording medium delivery block 50 on the rail portion 31 in arrow FB-directions through the above-mentioned recording medium delivery block base movement mechanism. Further, the conveying block 20 can move the recording medium delivery block 50 in arrow FC-directions through the above-mentioned recording medium delivery block holding portion movement mechanism. In addition, the conveying block 20 can rotate the recording medium delivery block 50 in arrow FD-directions through the above-mentioned recording medium delivery block rotation mechanism.

Therefore, the conveying block 20 can move the recording medium delivery block 50 to the position of the desired slot through the rail movement mechanism and the recording medium delivery block base movement mechanism. Further, the conveying block 20 can cause a recording medium insertion port of the recording medium delivery block 50 to be oriented in a direction of the desired slot 15 or a direction of a recording medium insertion port of the drive block 16 through the recording medium delivery block rotation mechanism. In addition, when the recording medium insertion port 561 of the recording medium delivery block 50 is oriented in a direction of the desired slot 15, the conveying block 20 can move the recording medium delivery block 50 in recording medium inserting and removing directions of the slot 15 through the recording medium delivery block holding portion movement mechanism. Further, when the recording medium insertion ports of the recording medium delivery block 50 and the drive blocks 16 are oriented to be opposed to each other, the conveying block 20 can move the recording medium delivery block 50 to the position of the recording medium insertion port 161 of the desired drive block 16 through the recording medium delivery block holding portion movement mechanism. Note that, when the recording medium delivery block 50 is positioned at a desired position by the conveying block 20, the recording medium delivery block 50 delivers the recording medium between the slot 15 and the drive block 16.

<4. Configuration of Recording Medium Delivery Block>

In the case where the recording medium changer is configured as described above, the recording medium changer can be reduced in size if the width of the space in which the conveying block 20 moves. Specifically, by reducing the size of the recording medium in the housing and discharging directions within the recording medium delivery block 50, the space necessary for delivering the recording medium can be reduced. Further, if an upper space necessary for delivering the recording medium is reduced, a distance between an uppermost recording medium and a top plate of the recording medium changer can also be reduced.

The recording medium delivery block delivers the recording medium by moving a slider with holding levers that hold the recording medium being supported to be rotatable and a recording medium delivery block chassis that supports the slider to be movable in the housing and discharging directions of the recording medium. By moving the slider and the recording medium delivery block chassis in this manner, the movement amount of the slider is reduced and the size of the recording medium in the housing and discharging directions within the recording medium delivery block 50 is reduced. Further, the holding levers are biased toward the recording medium in advance, and, when discharging the recording medium, the holding levers are rotated in a direction away from the recording medium to a position at which a lock state between the holding levers and the recording medium is released. The holding levers are operated in this manner, and hence the size of the space of the recording medium in the width direction that is necessary for delivering the recording medium is reduced.

FIGS. 14A-B, 15A-B, and 18A-B each illustrate a configuration of the recording medium delivery block. The recording medium delivery block 50 includes a slider 52, a slider movement mechanism, and the above-mentioned recording medium delivery block rotation mechanism in a recording medium delivery block chassis 51.

The slider 52 is provided to be movable in the housing and discharging directions of the recording medium 90 with respect to the recording medium delivery block chassis 51. A nut 521 is provided in the center portion of the slider 52. The nut 521 moves in an axial direction of the feed screw 553 when the feed screw 553 is rotated while meshing with a feed screw 553 of the slider movement mechanism to be described later. At the both end portions of the slider 52, a holding-lever support shaft 522 is provided. Holding levers 53U and 53L are rotatably held by the holding-lever support shaft 522.

The slider movement mechanism includes a slider moving motor 551, a drive transmission portion 552, the feed screw 553, and the like.

The slider moving motor 551 generates a driving force for moving the slider 52 in the recording medium housing and discharging directions within the recording medium delivery block 50 and rotates a gear of the drive transmission portion 552. A lowest gear of the drive transmission portion 552 meshes with a gear provided on one end portion of the feed screw 553. The feed screw 553 has an axial direction in the recording medium housing and discharging directions, and rotates with the recording medium housing and discharging directions being an axis by rotating the slider moving motor 551.

Figure 14B:
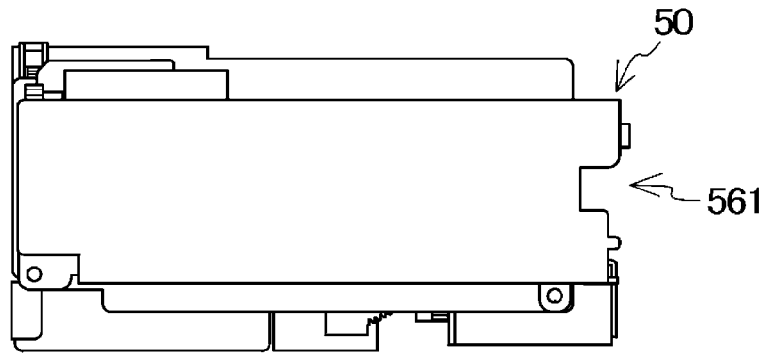
FIGS. 14A-B are views for explaining the configuration and operation of the recording medium delivery block (Part 1)
Figure 14A:
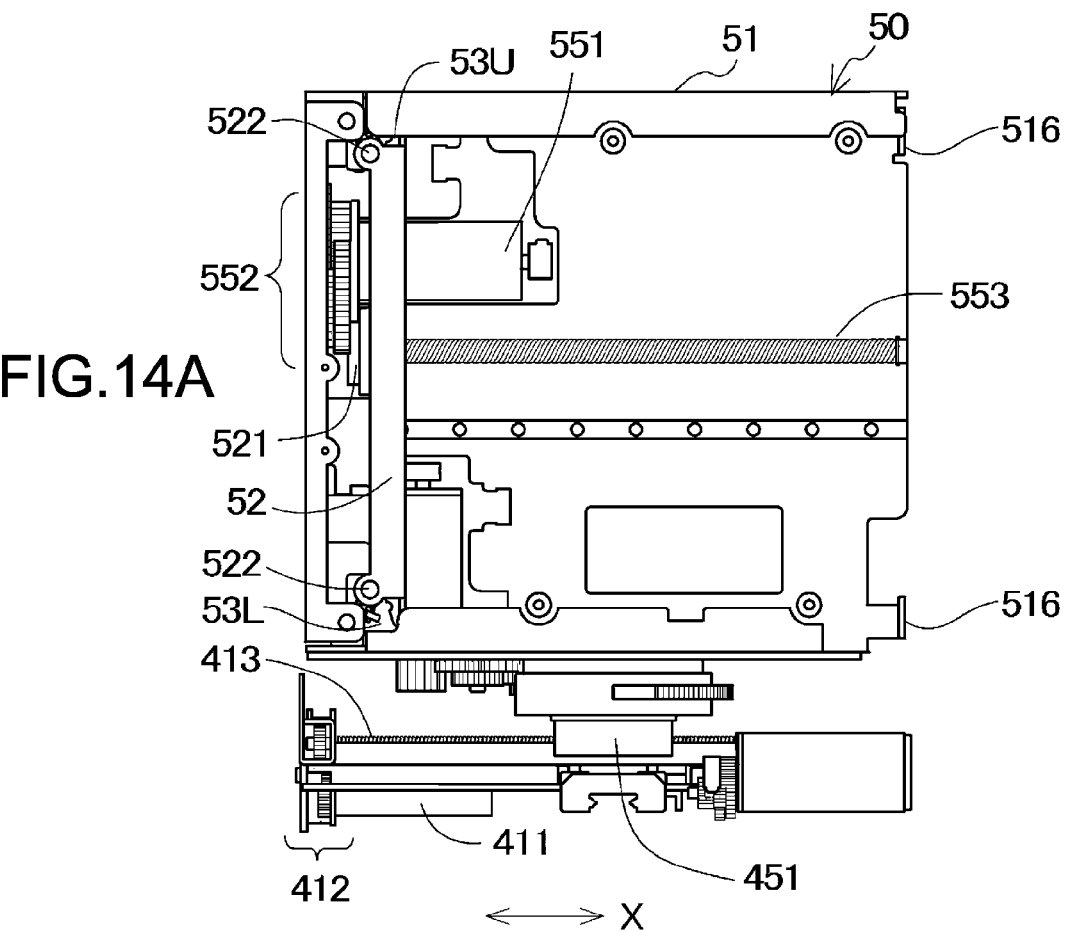

Note that FIGS. 14A-B illustrate a case where the slider 52 is positioned at a deepest position in the recording medium delivery block 50, that is, a housing completion position of the recording medium 90 (hereinafter, referred to as "home position"). Here, when the slider moving motor 551 is rotated, the slider 52 moves in a direction of the slot 15 or the drive block 16 (hereinafter, referred to as "outer direction"). As shown in FIGS. 15A-B, the holding levers 53U and 53L are protruded with respect to the recording medium delivery block chassis 51.

Further, the recording medium delivery block holding portion 45 is moved in the housing and discharging directions of the recording medium 90 through the above-mentioned recording medium delivery block holding portion movement mechanism. Therefore, the recording medium delivery block 50 rotatably held by the recording medium delivery block holding portion 45 is also moved in the housing and discharging directions through the recording medium delivery block holding portion movement mechanism. Therefore, the recording medium delivery block holding portion movement mechanism and the slider movement mechanism correspond to a housing and discharging drive unit that moves the recording medium delivery block chassis 51 and the slider 52 in housing and discharging directions of the recording medium. As will be described later, the housing and discharging drive unit controls a movement order and a movement amount of the chassis and the slider to house or discharge the recording medium. Further, the housing and discharging drive unit controls a movement order and a movement amount of the chassis and the slider to put the holding levers in a lock state or lock released state with respect to the recording medium.

<4-1. Configuration of Holding Levers>

FIGS. 16A-B illustrate a configuration of the holding levers. Note that FIG. 16A shows the holding levers when viewed from the direction of FIGS. 14A-B, FIGS. 15A-B, and FIGS. 18A-B and FIG. 16B shows the holding levers when viewed from the opposite direction of FIGS. 14A-B, FIGS. 15A-B, and FIGS. 18A-B.

In a main body portion 531 of the holding lever 53U (53L), a support hole 532 into which the holding-lever support shaft 522 is inserted is formed. Further, an arm 533 protruding in the outer direction is formed in a dog-leg shape in continuous with the main body portion 531 of the holding lever 53U (53L). At a leading end of the arm 533, an engagement claw 534 protruding from a side surface of the arm 533 is formed. The engagement claw 534 is formed such that the engagement claw 534 of the holding lever 53U is opposed to the engagement claw 534 of the holding lever 53L. An outer side surface of the engagement claw 534 is formed as a tilted slide surface 534a. In a surface side of the main body portion 531 of the holding lever 53U (53L), a spring lock portion 535 is provided. Further, in an end portion of the main body portion 531 of the holding lever 53U (53L) in the outer direction, a lever-opening operation portion 536 protruding in a perpendicular direction from a surface of the main body portion 531.

The spring lock portion 535 of the holding lever 53U (53L) locks one end portion of a biasing portion, for example, a biasing spring 538. The other end portion of the biasing spring 538 is locked by the slider 52 or the like. The engagement claws 534 of the holding levers 53U (53L) are biased by the biasing spring 538 in arrow FJ-directions being directions toward the recording medium, that is, directions such that the engagement claws 534 come closer to each other. Further, when the slider 52 moves in the outer direction, the engagement claw 534 of the holding lever 53U and the engagement claw 534 of the holding lever 53L are positioned at positions at which the slide surfaces 534a abut against front-surface side ends of the recording medium 90.

<4-2. Operation of Holding Levers>

Figure 17:
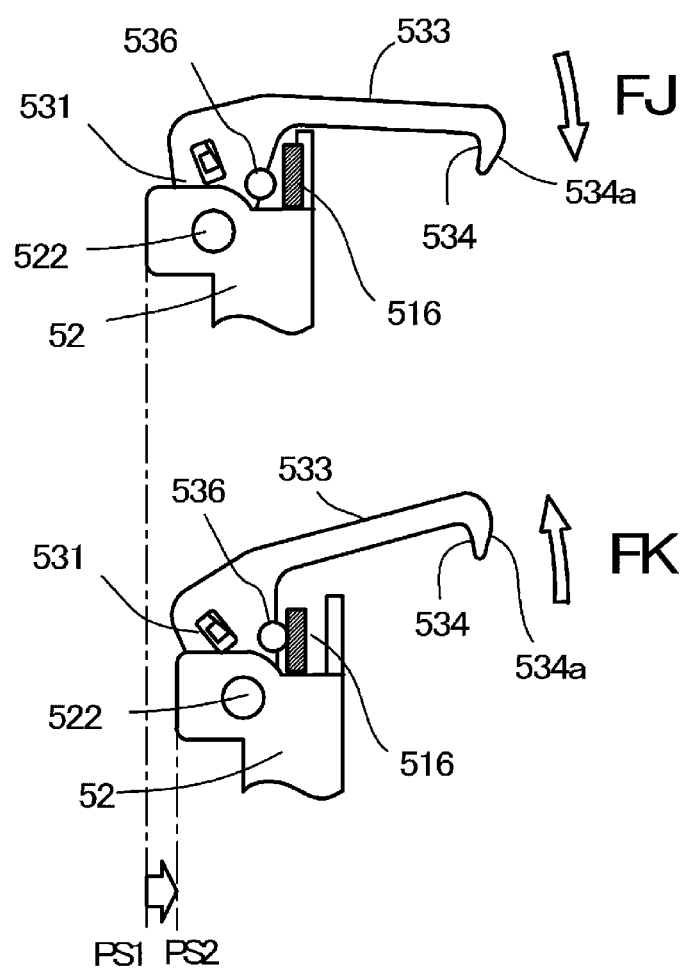
FIG. 17 is a view for explaining open and close operations of the holding levers.

FIG. 17 is a view for explaining open and close operations of the holding lever. The lever-opening operation portion 536 is formed in the holding lever 53L (53U). In an end portion of the recording medium delivery block chassis 51 on a side of the recording medium insertion port, a lever engagement portion 516 is formed at a position to be opposed to the lever-opening operation portion 536. When the slider 52 is at a position PS1, the lever-opening operation portion 536 is spaced apart from the lever engagement portion 516. Therefore, the engagement claw 534 of the holding lever 53U (53L) is at a position in a direction indicated by the arrow FJ due to a biasing force of the biasing spring 538.

When the slider 52 moves from the position PS1 in the outer direction, the lever-opening operation portion 536 is engaged with the lever engagement portion 516. Further, when the lever-opening operation portion 536 is engaged with the lever engagement portion 516, the holding lever 53U (53L) rotates in an opposite direction of a biasing direction of the biasing spring 538 with the holding-lever support shaft 522 being an axis due to a movement of the slider 52 in the outer direction. Therefore, when the slider 52 moves a position PS2 in the outer direction with respect to the position PS1, the engagement claws 534 move in an arrow-FK direction such that the engagement claws 534 move away from each other.

When the slider 52 is further moved from the position shown in FIGS. 15A-B in the outer direction, as shown in FIGS. 18A-B, the engagement claws 534 of the holding levers 53U (53L) are in an open state. Further, when the slider 52 moves from the position shown in FIGS. 18A-B in an opposite direction, that is, an inner direction, the engagement claws 534 of the holding levers 53U (53L) are in a closed state as shown in FIGS. 15A-B. In addition, when the slider 52 is moved from the position shown in FIGS. 15A-B in the inner direction, the engagement claws 534 of the holding levers 53U (53L) are housed in the recording medium delivery block 50 in the closed state, which is the state shown in FIGS. 14A-B.

Note that, as described above, the recording medium delivery block 50 is held by the recording medium delivery block holding portion 45 to be rotatable through the recording medium delivery block rotation mechanism. Further, as described above, the recording medium delivery block 50 is movable in a direction (X-direction) orthogonal to the rail longitudinal direction (Y-direction) by the recording medium delivery block holding portion movement mechanism.

In the conveying block 20 thus configured, by moving the slider 52 and the recording medium delivery block 50 in the recording medium housing and discharging directions, the size of the recording medium delivery block 50 in the recording medium housing and discharging directions is made smaller. Further, by using the holding levers 53U (53L) having the above-mentioned configuration, the size of the space of the recording medium in the width direction that is necessary for delivering the recording medium becomes smaller.

<5. Operation of Recording Medium Delivery Block>

FIGS. 19A-B to 23A-B show operations when the recording medium in the slot is housed in the recording medium delivery block in order. Note that regarding the recording medium delivery block 50, it is assumed that, for example, the state shown in FIGS. 14A-B is the home position as described above.

The control block 17 drives the slider moving motor 551 of the recording medium delivery block 50 to move the slider 52 in the outer direction indicated by an arrow FP as shown in FIGS. 19A-B. When the slider 52 moves in the outer direction, the slide surfaces 534a of the engagement claws 534 provided to the arms 533 in the holding levers 53U (53L) abut against the front-surface side ends of the recording medium 90. The control block 17 further moves the slider 52 in the outer direction such that the slide surfaces 534a of the engagement claws 534 slide on the front-surface side ends of the recording medium 90. In this manner, as shown in FIGS. 20A-B, the engagement claws 534 are put on the side surfaces of the recording medium 90. Note that the control block 17 stops the movement of the slider 52 at a position at which the lever-opening operation portions 536 provided to the holding levers 53U (53L) is about to abut against the lever engagement portions 516 formed in the recording medium delivery block chassis 51.

Next, the control block 17 rotates the feed screw 413 by the holding portion moving motor 411. When the feed screw 413 is rotated by the holding portion moving motor 411, the nut 451 of the recording medium delivery block holding portion 45 moves due to the rotation of the feed screw 413. Specifically, the control block 17 causes the holding portion moving motor 411 to rotate the feed screw 413, such that the recording medium delivery block 50 rotatably held by the recording medium delivery block holding portion 45 is moved in the outer direction shown in an arrow FQ. When the recording medium delivery block 50 is moved in the outer direction, the engagement claws 534 provided to the arms 533 of the holding levers 53U (53L) slide on the side surfaces of the recording medium 90 and are locked in lock grooves 91 formed in the side surfaces of the recording medium 90 as shown in FIGS. 21A-B.

After that, the control block 17 rotates the holding portion moving motor 411 in an opposite direction to move the recording medium delivery block holding portion 45 in the inner direction indicated by an arrow FR as shown in FIGS. 22A-B in a state in which the engagement claws 534 are locked in the lock grooves 91 of the recording medium 90. That is, the recording medium delivery block 50 is moved in the inner direction. Further, the control block 17 drives the slider moving motor 551 of the recording medium delivery block 50 to move the slider 52 in the inner direction indicated by an arrow FS. Therefore, the recording medium 90 is taken out from the slot and pulled in the inside of the recording medium delivery block 50.

By moving the recording medium delivery block 50 and the slider 52 in this manner, the recording medium 90 can be pulled in and held to the home position in the recording medium delivery block 50 as shown in FIGS. 23A-B.

Next, a case where the recording medium 90 installed at the home position of the recording medium delivery block 50 is discharged into the slot 15 will be described. FIGS. 24A-B to 29A-B show operations when the recording medium 90 installed in the recording medium delivery block 50 is discharged into the slot 15 in order.

The control block 17 drives the slider moving motor 551 of the recording medium delivery block 50 and moves the slider 52 in the outer direction indicated by an arrow FP as shown in FIGS. 24A-B. By moving the slider 52 in the outer direction in this manner, the recording medium 90 is discharged. Note that the engagement claws 534 provided to the arms 533 of the holding levers 53U (53L) is locked in the lock grooves 91 of the recording medium 90.

The control block 17 drives the slider moving motor 551 of the recording medium delivery block 50 to move the slider 52 such that the lever-opening operation portion 536 is engaged with the lever engagement portion 516 of the recording medium delivery block chassis 51. Therefore, each holding lever 53U (53L) rotates in an opposite direction of the abutting direction of the biasing spring 538 with the holding-lever support shaft 522 being an axis, such that the engagement claw 534 is away from the lock groove 91 provided in the side surface of the recording medium 90 as shown in FIGS. 25A-B.

After that, the control block 17 causes the holding portion moving motor 411 to rotate the feed screw 413. When the feed screw 413 is rotated by the holding portion moving motor 411, the nut 451 of the recording medium delivery block holding portion 45 moves due to the rotation of the feed screw 413. Specifically, the control block 17 causes the holding portion moving motor 411 to rotate the feed screw 413, to thereby move the recording medium delivery block 50 rotatably held by the recording medium delivery block holding portion 45 in the outer direction indicated by an arrow FQ. By moving the recording medium delivery block 50 in the outer direction in this manner, the recording medium 90 is pushed into a predetermined position within the slot as shown in FIGS. 26A-B. Therefore, the recording medium can be installed at the predetermined position within the slot.

Next, the control block 17 causes the holding portion moving motor 411 to rotate the feed screw 413 in an opposite direction. When the feed screw 413 is rotated by the holding portion moving motor 411 in the opposite direction, the nut 451 of the recording medium delivery block holding portion 45 moves in the opposite direction due to the rotation of the feed screw 413. Specifically, the control block 17 rotates the feed screw 413 in the opposite direction to move the recording medium delivery block 50 in the inner direction indicated by an arrow FS in a state in which the engagement claw 534 provided to the arm 533 of the holding lever 53U (53L) is away from the lock groove 91 of the recording medium 90. Therefore, as shown in FIGS. 27A-B, the engagement claw 534 is at a position in a recording medium front surface direction with respect to the lock groove 91 of the recording medium 90.

After that, the control block 17 drives the slider moving motor 551 of the recording medium delivery block 50 to move the slider 52 in the inner direction indicated by an arrow FR. When the slider 52 moves in the inner direction, the lever-opening operation portion 536 moves away from the lever engagement portion 516 and the engagement claw 534 rotates. At this time, the engagement claw 534 provided to the arm 533 of the holding lever 53U (53L) is positioned at the position on a recording medium front surface side with respect to the lock groove 91 of the recording medium 90, and hence the engagement claw 534 is not locked in the lock groove 91 of the recording medium 90 even if the engagement claw 534 rotates. Therefore, as shown in FIGS. 28A-B, in the state in which the recording medium 90 is installed in the slot, only the slider 52 can be moved in the inner direction indicated by an arrow FR.

In addition, the control block 17 drives the slider moving motor 551 of the recording medium delivery block 50 to move the slider 52 to the home position as shown in FIGS. 29A-B. Therefore, the recording medium delivery block 50 is at the home position in the state in which the recording medium is not installed therein.

Further, when the recording medium 90 taken out from the slot 15 and held by the recording medium delivery block 50 is mounted on the drive block 16 and when the recording medium 90 discharged from the drive block 16 is returned into the slots 15, the recording medium delivery block 50 is rotated by the recording medium delivery block rotation mechanism such that the recording medium insertion port 561 of the recording medium delivery block 50 is opposed to the recording medium insertion port 161 of the drive block 16. In addition, the recording medium delivery block 50 is moved by the recording medium delivery block base movement motor 401 in the rail longitudinal direction to a position spaced apart from the drive block 16 by a predetermined distance.

After that, the recording medium delivery block 50 delivers the recording medium 90 as described above. Note that, in the case where delivering of the recording medium 90 is performed with respect to the drive block 16, the orientation of the recording medium delivery block 50 is different, for example, by 90 degrees as shown in FIG. 2 in comparison with the case where delivering of the recording medium 90 is performed with respect to the slot 15. Therefore, by performing the movement of the recording medium delivery block 50 through the recording medium delivery block base movement motor 401 instead of the holding portion moving motor 411, similar operations can be performed.

Further, when the direction of the slot 15 and the direction of the recording medium insertion port of the drive block 16 are different by 90 degrees with respect to the recording medium delivery block 50, a movement direction of the recording medium delivery block 50 by the holding portion moving motor 411 becomes a lateral arrangement direction (X-direction) of the drive blocks 16. Thus, the holding portion moving motor 411 can position the recording medium insertion port 561 of the recording medium delivery block 50 at the position of the recording medium insertion port 161 of the desired drive block 16. Therefore, the recording medium changer 10 does not need to include an independent movement mechanism that moves the recording medium insertion port of the recording medium delivery block 50 to the position of the recording medium insertion port of the desired drive block 16. Thus, for example, the configuration of the recording medium changer can be made simple.

Further, the movement of the slider 52 and the recording medium delivery block 50 is not limited to be performed in the case where the holding portion moving motor 411 and the slider moving motor 551 are provided as in the above-mentioned embodiment. For example, a configuration in which the movement of the slider 52 and the recording medium delivery block 50 is performed by switching and using a driving force of a single moving motor may be adopted. Further, the holding levers are not limited to be provided as a pair as described above and a single holding lever or a plurality of pairs of holding levers may be used, for example.

In addition, the present disclosure should not be construed as being limited to the above-mentioned embodiment of the present disclosure. The embodiment of the present disclosure is merely an example and it is obvious that modifications or substitutions of the embodiment can be made by those skilled in the art without departing from the gist of the present disclosure. Thus, for determining the gist of the present disclosure, the scope of claims should be considered.

Note that the recording medium delivery mechanism of the present disclosure may also take the following configurations.

(1) A recording medium delivery mechanism, including:

a slider that is supported on a chassis to be movable in housing and discharging directions of a recording medium;

a holding lever that is rotatably supported by the slider and configured to hold the recording medium;

a biasing portion configured to bias the holding lever toward the recording medium;

a lever-opening operation portion that is provided to the holding lever, is engaged with a lever engagement portion provided to the chassis by a movement of the slider in the discharging direction of the recording medium, and configured to rotate the holding lever in a direction away from the recording medium; and a housing and discharging drive unit configured to move the chassis and the slider in the housing and discharging directions of the recording medium.

(2) The recording medium delivery mechanism according to (1), in which the housing and discharging drive unit is configured to perform one of housing and discharging of the recording medium by controlling a movement order and a movement amount of the chassis and the slider.

(3) The recording medium delivery mechanism according to (1) or (2), in which the housing and discharging drive unit is configured to put the holding lever in one of a lock state and a lock released state with respect to the recording medium by controlling the movement order and the movement amount of the chassis and the slider.

(4) The recording medium delivery mechanism according to any one of (1) to (3), in which the housing and discharging drive unit is configured to move, when housing the recording medium, the slider in a direction of the recording medium to be housed to a position at which the lever-opening operation portion is about to be engaged with the lever engagement portion, and then move the chassis in the direction of the recording medium, to thereby lock the holding lever with respect to the recording medium.

(5) The recording medium delivery mechanism according to (4), in which the housing and discharging drive unit is configured to perform housing of the recording medium by returning the slider and the chassis to positions before the movement in a state in which the holding lever is locked with respect to the recording medium.

(6) The recording medium delivery mechanism according to any one of (1) to (5), in which the housing and discharging drive unit is configured to move, when discharging the housed recording medium, the slider in the discharging direction of the recording medium, engage the lever-opening operation portion with the lever engagement portion, and rotate the holding lever in the direction away from the recording medium, and then move the chassis in the discharging direction of the recording medium.

(7) The recording medium delivery mechanism according to (6), in which
the housing and discharging drive unit is configured to return the chassis to the position before the movement and then perform processing of returning the slider to the position before the movement.

(8) The recording medium delivery mechanism according to (6) or (7), in which
the lever-opening operation portion is configured to rotate the holding lever in the direction away from the recording medium by the engagement with the lever engagement portion to a position at which a lock state with respect to the recording medium is released.

In the recording medium delivery mechanism and the recording medium changer according to the embodiments of the present disclosure, provided are the slider that is supported on the chassis to be movable in the housing and discharging directions of the recording medium, the holding lever that is rotatably supported by the slider and configured to hold the recording medium, the biasing portion configured to bias the holding lever toward the recording medium, the lever-opening operation portion that is provided to the holding lever, is engaged with the lever engagement portion provided to the chassis by the movement of the slider in the discharging direction of the recording medium, and configured to rotate the holding lever in the direction away from the recording medium, and the housing and discharging drive unit configured to move the chassis and the slider in the housing and discharging directions of the recording medium. Therefore, it is unnecessary to move the slider until the holding lever is locked with respect to the recording medium, and hence the movement amount of the slider can be reduced. Thus, the size of the recording medium in the housing and discharging directions can be reduced. Therefore, the recording medium delivery mechanism and the recording medium changer according to the embodiments of the present disclosure are suitable to a recording medium changer that houses, in slots, recording media or cartridges in which the recording media are housed, for example, tapes, discs, semiconductor memories, or cartridges in which they are housed, and selectively uses the recording media installed in the slots.

It should be understood by those skilled in the art that various modifications, combinations, sub-combinations and alterations may occur depending on design requirements and other factors insofar as they are within the scope of the appended claims or the equivalents thereof.

What is claimed is:

1. A recording medium delivery mechanism, comprising:
a slider that is supported on a chassis to be movable in housing and discharging directions of a recording medium;
a holding lever that is rotatably supported by the slider and configured to hold the recording medium;
a biasing portion configured to bias the holding lever toward the recording medium;
a lever-opening operation portion provided as part of the holding lever, wherein the lever-opening operation portion is engaged with a lever engagement portion of the chassis by a movement of the slider in the discharging direction of the recording medium, wherein the lever-opening operation portion is configured to rotate the holding lever in a direction away from the recording medium by engaging the lever engagement portion, wherein
the holding lever further includes an engagement claw, wherein the holding lever is rotatably held by a holding lever support shaft interconnected to the slider, and wherein the lever opening operation portion is disposed between the engagement claw and the holding lever support shaft; and
a housing and discharging drive unit configured to move the chassis and the slider in the housing and discharging directions of the recording medium.

2. The recording medium delivery mechanism according to claim 1, wherein
the housing and discharging drive unit is configured to perform one of housing and discharging of the recording medium by controlling a movement order and a movement amount of the chassis and the slider.

3. The recording medium delivery mechanism according to claim 2, wherein
the housing and discharging drive unit is configured to put the holding lever in one of a lock state and a lock released state with respect to the recording medium by controlling the movement order and the movement amount of the chassis and the slider.

4. The recording medium delivery mechanism according to claim 3, wherein
the housing and discharging drive unit is configured to move, when housing the recording medium, the slider in a direction of the recording medium to be housed to a position at which the lever-opening operation portion is about to be engaged with the lever engagement portion, and then move the chassis in the direction of the recording medium, to thereby lock the holding lever with respect to the recording medium.

5. The recording medium delivery mechanism according to claim 4, wherein
the housing and discharging drive unit is configured to perform housing of the recording medium by returning the slider and the chassis to positions before the movement in a state in which the holding lever is locked with respect to the recording medium.

6. The recording medium delivery mechanism according to claim 3, wherein
the housing and discharging drive unit is configured to move, when discharging the housed recording medium, the slider in the discharging direction of the recording medium, engage the lever-opening operation portion with the lever engagement portion, and rotate the holding lever in the direction away from the recording medium, and then move the chassis in the discharging direction of the recording medium.

7. The recording medium delivery mechanism according to claim 6, wherein
the housing and discharging drive unit is configured to return the chassis to the position before the movement and then perform processing of returning the slider to the position before the movement.

8. The recording medium delivery mechanism according to claim 6, wherein
the lever-opening operation portion is configured to rotate the holding lever in the direction away from the recording medium by the engagement with the lever engagement portion to a position at which a lock state with respect to the recording medium is released.

9. The recording medium delivery mechanism according to claim 1, wherein
the lever-opening operation portion protrudes in a perpendicular direction from a surface of a main body portion of the holding lever.

10. The recording medium delivery mechanism according to claim 1, wherein the lever-opening operation portion is integral to the holding lever.

11. A recording medium changer, comprising:
a plurality of slots in which a recording medium is housed;
a drive configured to perform an operation using the recording medium; and
a recording medium delivery mechanism configured to deliver the recording medium between the plurality of slots and the drive, the recording medium delivery mechanism including
 a slider that is supported on a chassis to be movable in housing and discharging directions of a recording medium,
 a holding lever that is rotatably supported by the slider and configured to hold the recording medium,
 a biasing portion configured to bias the holding lever toward the recording medium,
 a lever-opening operation portion provided as part of the holding lever, wherein the lever-opening operation portion is engaged with a lever engagement portion of the chassis by a movement of the slider in the discharging direction of the recording medium, wherein the lever-opening operation portion is configured to rotate the holding lever in a direction away from the recording medium by engaging lever engagement portion, wherein
the holding lever further includes an engagement claw, wherein the holding lever is rotatably held by a holding lever support shaft interconnected to the slider, and wherein the lever opening operation portion is disposed between the engagement claw and the holding lever support shaft, and
a housing and discharging drive unit configured to move the chassis and the slider in the housing and discharging directions of the recording medium.

12. The recording medium changer according to claim 11, further comprising
a rotational holding mechanism configured to rotatably hold the chassis such that the housing and discharging directions of the recording medium can be switched to one of directions of the slot and the drive, wherein
the housing and discharging drive unit is configured to move the chassis held by the rotational holding mechanism.

* * * * *